(12) United States Patent
Sakata

(10) Patent No.: US 11,959,568 B2
(45) Date of Patent: Apr. 16, 2024

(54) RETAINER AND PIPE JOINT USING RETAINER

(71) Applicant: Hitachi Metals, Ltd., Tokyo (JP)

(72) Inventor: Shindo Sakata, Tokyo (JP)

(73) Assignee: Proterial, Ltd., Tokyo (JP)

( * ) Notice: Subject to any disclaimer, the term of this patent is extended or adjusted under 35 U.S.C. 154(b) by 169 days.

(21) Appl. No.: 17/442,881

(22) PCT Filed: Mar. 27, 2020

(86) PCT No.: PCT/JP2020/014035
§ 371 (c)(1),
(2) Date: Sep. 24, 2021

(87) PCT Pub. No.: WO2020/203778
PCT Pub. Date: Oct. 8, 2020

(65) Prior Publication Data
US 2022/0154862 A1 May 19, 2022

(30) Foreign Application Priority Data
Mar. 29, 2019 (JP) .................................. 2019-067158

(51) Int. Cl.
*F16L 25/00* (2006.01)
*F16L 33/035* (2006.01)
*F16L 33/18* (2006.01)

(52) U.S. Cl.
CPC ......... *F16L 25/0045* (2013.01); *F16L 33/035* (2013.01); *F16L 33/18* (2013.01)

(58) Field of Classification Search
CPC ... F16L 25/0036; F16L 25/0045; F16L 33/26; F16L 37/091
See application file for complete search history.

(56) References Cited

U.S. PATENT DOCUMENTS 5,603,530 A * 2/1997 Guest .................... F16L 37/091
6,502,866 B1 * 1/2003 Hujisawa ............ F16L 25/0036
(Continued)

FOREIGN PATENT DOCUMENTS

CN 107002919 A 8/2017
JP 2000-193165 A 7/2000
(Continued)

OTHER PUBLICATIONS

Extended European Search Report dated Oct. 13, 2022, of counterpart European Patent Application No. 20783043.1.

*Primary Examiner* — Zachary T Dragicevich
(74) *Attorney, Agent, or Firm* — DLA Piper LLP (US)

(57) ABSTRACT

A retainer allows reduction in a length in a direction of insertion of a flexible pipe and capable of being engaged with the flexible pipe without requiring motions of other members. The retainer is a retainer having a shape of a ring and used in a pipe joint, including: a plurality of pawls for getting into a valley of a corrugated pipe of a flexible pipe to be inserted into the pipe joint; a plurality of supports for contacting an inner surface of a pipe joint body housing the retainer in the pipe joint, the supports being continuous with corresponding ones of the pawls as viewed in a direction of a center axis of the ring of the retainer; and a connector connecting the pawls and the supports in a plurality of combinations continuous with each other. The connector is more elastically deformable than the pawls and the supports.

5 Claims, 15 Drawing Sheets

(56) References Cited

U.S. PATENT DOCUMENTS

| | | | |
|---|---|---|---|
| 2006/0125235 A1* | 6/2006 | Andre | F16L 37/091 |
| 2010/0176587 A1* | 7/2010 | Oh | F16L 25/0045 |
| 2014/0145434 A1* | 5/2014 | Oh | F16L 25/0036 |
| 2015/0159792 A1* | 6/2015 | Bobo | F16L 37/091 |
| 2017/0292644 A1 | 10/2017 | Girola | |
| 2018/0038533 A1* | 2/2018 | Ibayashi | F16L 33/26 |

FOREIGN PATENT DOCUMENTS

| | | |
|---|---|---|
| JP | 2009-079755 A | 4/2009 |
| JP | 2014-013082 A | 1/2014 |
| KR | 2019-0018858 A | 2/2019 |

* cited by examiner

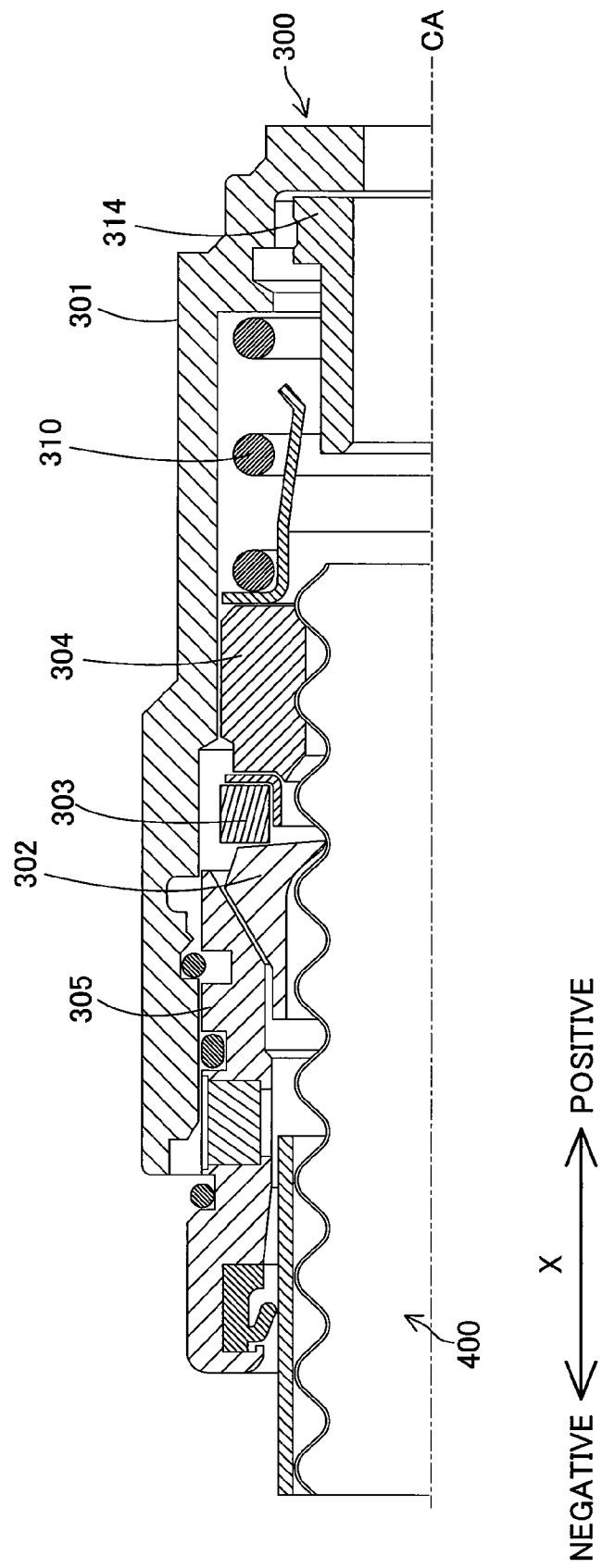

RETAINER AND PIPE JOINT USING RETAINER

TECHNICAL FIELD

This disclosure relates to a pipe joint used for connection of a flexible pipe, and a retainer used in the pipe joint.

BACKGROUND

A pipe joint known as a pipe joint for connection between a flexible pipe and a gas valve or a steel pipe allows the connection only by inserting the flexible pipe and allows work of the connection to be checked reliably (JP 2009-79755 A). As shown in FIG. 14 of JP '755, an elastic member 310 in a compressed state is fitted in a pipe joint body 301. As shown in FIG. 15, when a flexible pipe 400 is inserted in an X positive direction from the left, a movable piece 314 is moved with a tip of the flexible pipe 400 toward the back of the pipe joint body 301 to release the elastic member 310 from the compressed state. Using the resultant biasing force of the elastic member 310, a gasket 304 is moved in an X negative direction. The moved gasket 304 presses a retainer 302 through a fireproof gasket 303. The pressed retainer 302 comes into abutting contact with a pressure ring 305 and is reduced in outer diameter to be engaged with the flexible pipe. By doing so, the gasket 304 is compressed by the biasing force of the elastic member 310 between the retainer 302 and the elastic member 310. This improves the sealing surface pressure of the compressed gasket 304 with the flexible pipe 400. The pipe joint 300 operating in this way is disclosed in JP '755.

However, the conventional pipe joint 300 requires a plurality of members to contribute to the engagement between the retainer 302 and the flexible pipe 400 to be arranged one by one along a center axis CA of the pipe joint 300. Hence, the pipe joint 300 has been required to have a sufficient length in the X direction in which the flexible pipe 400 is to be inserted. Also, the occurrence of abnormality at any of the plurality of members may cause risk of failing to provide the engagement between the retainer 302 and the flexible pipe 400 properly. It has therefore been desired to provide a pipe joint allowing reduction in length in the direction of insertion of the flexible pipe 400 and allowing the retainer 302 to be engaged with the flexible pipe 400 without requiring motions of other members.

SUMMARY (1) A retainer having a shape of a ring is provided. Inserting a flexible pipe with a corrugated pipe formed into a corrugated pattern in an axis direction makes the retainer available in a pipe joint connected to the flexible pipe. The retainer includes: a plurality of pawls for getting into a valley of the corrugated pattern of the corrugated pipe; a plurality of supports for contacting an inner surface of a pipe joint body housing the retainer in the pipe joint, the supports being continuous with corresponding ones of the pawls as viewed in a direction of a center axis of the ring of the retainer; and a connector connecting the pawls and the supports in a plurality of combinations continuous with each other, wherein the connector is provided to be more deformable than the pawls and the supports. When the flexible pipe is inserted into the pipe joint, a peak of the corrugated pipe and the pawl of the retainer may come into contact with each other. By inserting the flexible pipe further, pressing force is applied from the flexible pipe to the retainer at which the connector is deformed to displace the pawl in a direction of moving away from the flexible pipe and to displace the support in a direction of moving away from the inner surface of the pipe joint body. The pawl of the retainer continuously subjected to application of the pressing force from the flexible pipe gets over the peak while being displaced.

(2) The retainer may be configured such that the connector includes: a first section extending toward a first combination that is one of two combinations each including the pawl and the support and arranged across the connector, the first section being connected to the first combination; and a second section extending toward a second combination that is the other of the two combinations, the second section being connected to the second combination, wherein the first section and the second section extend in directions differing from each other.

In this configuration, in response to rotation of the support belonging to the first combination, the first section receives torsion from the first combination acting in the direction in which the first section extends to get warped. On the other hand, the second section extends in the direction differing from the direction of the first section. Thus, in response to the rotation of the support belonging to the first combination, the second section receives bending force to be bent. Likewise, in response to rotation of the support belonging to the second combination, the second section receives torsion from the second combination acting in the direction in which the second section extends to get warped. On the other hand, the first section extends in the direction differing from the direction of the second section. Thus, in response to the rotation of the support belonging to the second combination, the first section receives bending force to be bent. In this way, in the above-described configuration, in response to rotation of one support, the first section and the second section of the connector next to this support receive bending force and torsion to deform in their ways, thereby absorbing displacement of the support. This allows the retainer to stably deform more easily than in a configuration in which the connector connects the first combination and the second combination linearly. If one support rotates more largely than a different support, for example, a likelihood of break of the connector in the vicinity of this support is reduced.

(3) The retainer may be configured such that the connector further includes a third section arranged between the first section and the second section and less deformable than the first section and the second section.

In this configuration, in response to rotation of the support connected to the connector, the third section less likely to deform located between the first section and the second section acts to retain the orientations of the first section and the second section relative to each other. This fulfills the function of sharing torsion and bending force between the first section and the second section more easily than in a configuration without the third section.

(4) The retainer may be configured such that each of the plurality of pawls includes a plurality of tips extending toward the center axis.

If the pawl has an approximately rectangular outer shape curved concentrically with the ring of the retainer, the tip of the pawl contacts the valley of the corrugated pipe at a linear contact area, more specifically, at an arc-like contact area. By contrast, in the above-described configuration, the plurality of tips of the pawl each contacts the valley of the corrugated pipe at a smaller contact area. This allows the corrugated pipe to be retained more firmly.

(5) The retainer may be configured such that each of the plurality of pawls includes: a base continuous with a corresponding one of the plurality of supports; and the plurality of tips configured to be thinner than the base.

In this configuration, the tip contacts the valley of the corrugated pipe at a contact area smaller than that in a configuration in which the pawl is formed into a constant thickness. This allows the corrugated pipe to be retained more firmly. On the other hand, the base is configured to be thicker than the tip. This allows the base to work effectively in inhibiting plastic deformation of the pawl to be caused by force applied to the pawl.

(6) A pipe joint to which the flexible pipe is to be connected may include the retainer and the pipe joint body housing the retainer. A constructor may be allowed to form engagement between the retainer and the flexible pipe only through the motion of inserting the flexible pipe without requiring motions of other members.

(7) The pipe joint may be configured such to rotate the support toward a direction of the inner surface of the pipe joint body and to rotate the pawl toward a direction of an outer periphery of the flexible pipe about the connector of the retainer. The support and the inner surface of the pipe joint body contacting the support suppress displacement of the pawl. Thus, if pulling force is applied to the flexible pipe, the support supported on the inner surface of the pipe joint body does not cause further displacement. This also prevents the pawl continuous with the support from being displaced further. As a result, the flexible pipe is not pulled out by the application of pulling force substantially equal to the force applied during its insertion. Namely, it becomes possible to achieve both the engagement of the flexible pipe by the application of small force and firm retention of the flexible pipe.

(8) A receiving part that receives a tip of the flexible pipe after being inserted may be provided, and the pawl of the retainer may be provided at a position at which the pawl is to be engaged with the corrugated pipe of the flexible pipe at a backward valley spaced by one peak from the tip of the flexible pipe while the amount of insertion of the flexible pipe is limited by the receiving part. The engagement between the retainer and the corrugated pipe occurs only once during insertion of the flexible pipe. This allows the constructor to reliably sense the connection between the flexible pipe and the pipe joint through one reaction, as compared to when the pawl of the retainer is engaged at a nearby position spaced by a plurality of peaks of the corrugated pipe.

(9) The pipe joint may further include: a gasket formed into a ring-like shape for receiving the flexible pipe; and a pressure member that presses an end surface of the gasket in a direction of insertion of the flexible pipe, wherein the pressure member, the gasket, and the retainer may be arranged in this order in the direction of insertion of the flexible pipe, and a relative distance between the pressure member and the retainer may be limited by a fixing member including the pipe joint body. The relative distance between the pressure member and the retainer is limited by the fixing member. Thus, the gasket pressed in the direction of insertion of the flexible pipe by the pressure member is prohibited from moving in the direction of insertion of the flexible pipe to be compressed. For this reason, the gasket expands in a direction vertical to the direction of insertion of the flexible pipe. As a result, the flexible pipe is firmly sealed at its periphery. Furthermore, even on the occurrence of age deterioration of the gasket, application of pressing force from the pressure member to the gasket acting in the direction of insertion of the flexible pipe makes it unlikely that sealing properties will be reduced around the flexible pipe. The pressure member may include an elastic member and a ring-like fastening member arranged between the elastic member and the gasket, the fastening member, the gasket, and the retainer may be made deformable in the direction of insertion of the flexible pipe in response to deformation of the elastic member caused by force applied through the flexible pipe to the retainer, the fixing member may include a window part through which an interior is visible and a wall part through which the interior is invisible, and the fastening member and the fixing member may be configured such that, in response to displacement of the fastening member, the fastening member may be placed at a position at which a part of the fastening member overlaps the wall part and at a position at which the part of the fastening member overlaps the window part. In this configuration, while the pawl of the retainer is inside the valley of the corrugated pipe, pulling the flexible pipe in a direction opposite the direction of insertion of the flexible pipe displaces the retainer, the gasket, and the fastening member together with the flexible pipe in the direction opposite the direction of insertion of the flexible pipe. At this time, the elastic member is compressed to be deformed. As the fastening member is displaced in the direction opposite the direction of insertion of the flexible pipe, a part of the fastening member is located at a position overlapping the window part. Thus, by visually recognizing the part of the fastening member through the window part, the constructor becomes capable of confirming that the pawl of the retainer is inside the valley of the corrugated pipe. In this way, it becomes possible to confirm that the flexible pipe is retained by the retainer. The fastening member may include an indicator ring as the part of the fastening member, and a ring-like pressure ring including a first indicator ring groove with an outer periphery housing a part of the indicator ring on its inner peripheral side, the wall part may be a pipe joint body housing the pressure ring and having an inner peripheral surface provided with a second indicator ring groove housing a part of the indicator ring on its outer peripheral side, the indicator ring may be configured to be reducible in outer diameter in response to receipt of external force, and the pressure member and the fixing member may be configured to be placed in a state in which the indicator ring is at a position overlapping the wall part and is housed in the first indicator ring groove and the second indicator ring groove, and a state in which the indicator ring is at a position overlapping the window part and is located outside the first indicator ring groove and the second indicator ring groove. In this configuration, before insertion of the flexible pipe, the indicator ring is housed at the position overlapping the wall part. After insertion of the flexible pipe, when the constructor applies pulling force to the flexible pipe for checking the insertion, the pressure ring is moved in the direction opposite the direction of insertion of the flexible pipe through the retainer and the gasket. In response to this movement, the indicator ring moves out of the first indicator ring groove and the second indicator ring groove to be fixed at the position overlapping the window part. The moved indicator ring becomes visually recognizable through the window part. In this way, the constructor is allowed to insert the flexible pipe reliably.

(10) The pipe joint may be configured such that the pipe joint body houses the retainer in a housing having an inner diameter greater than an outer diameter defined by outer peripheries of the plurality of supports of the retainer, and the pipe joint body and the retainer are configured such that, when the corrugated pipe receives force acting in a direction of pulling the corrugated pipe out of the pipe joint while the plurality of pawls is inside the valley, the support having received the force through the plurality of pawls rotates to contact the housing.

This configuration facilitates incorporation of the retainer into the pipe joint body. On the other hand, when the corrugated pipe receives force acting in a direction of pulling the corrugated pipe out of the pipe joint, the pipe joint body prevents the support from rotating to a degree equal to or greater than a certain degree. As a result, it becomes possible to strongly prevent pulling out of the corrugated pipe using the retainer.

I thus provide a retainer and the pipe joint, as well as a method of manufacturing the pipe joint, a method of connecting a pipe to the pipe joint, and a method of manufacturing the pipe joint to which the pipe is connected.

BRIEF DESCRIPTION OF THE DRAWINGS

FIG. 15 is a partial sectional side view showing the conventional pipe joint in a state after construction.

REFERENCE SIGNS LIST

Figure 1:
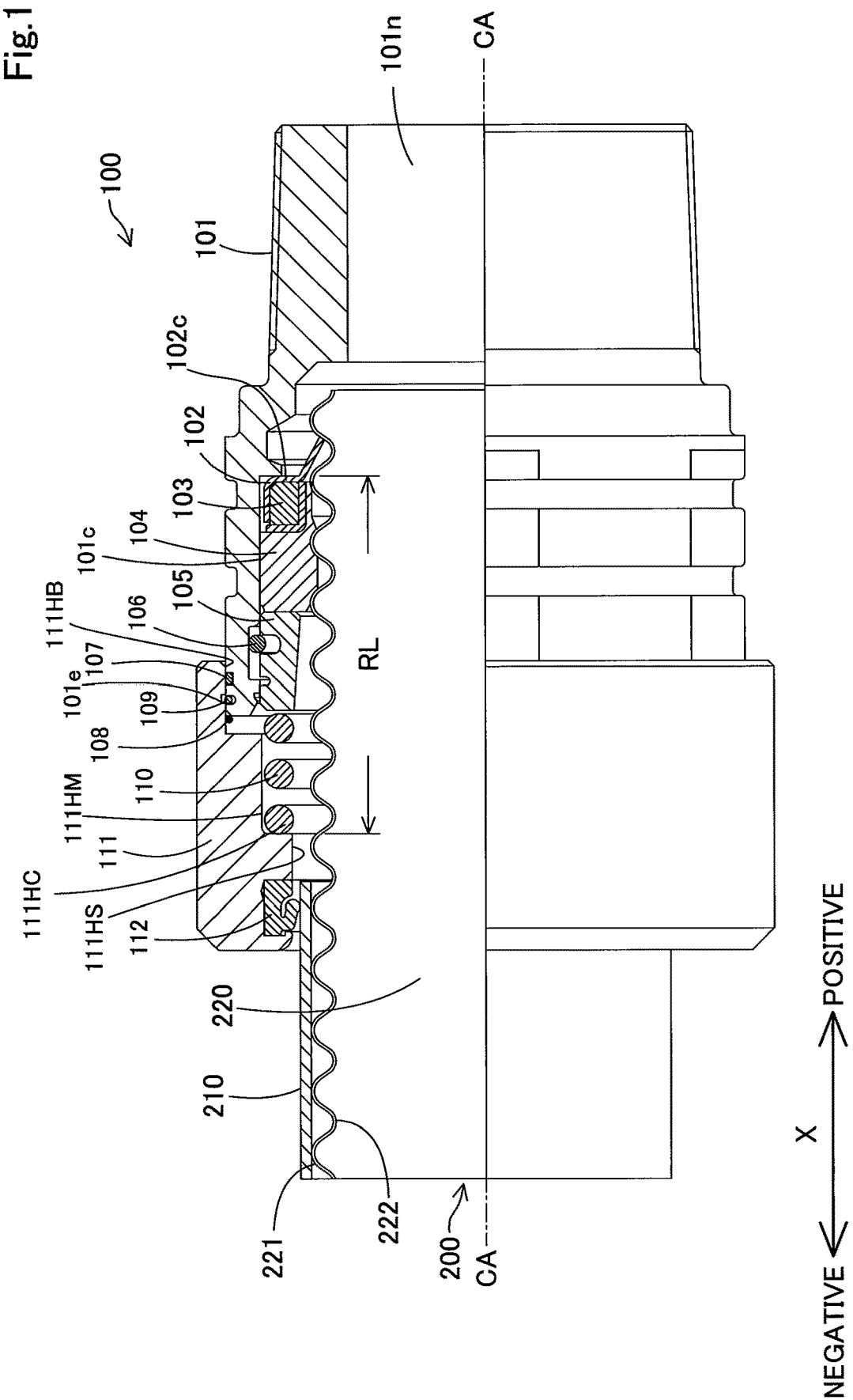
FIG. 1 is a partial sectional side view of a pipe joint according to an example.

100 . . . Pipe joint
100B . . . Pipe joint
101 . . . Pipe joint body
101B . . . Pipe joint body
101$a$ . . . Protrusion
101$a$B . . . Protrusion
101$b$ . . . Inner surface
101$b$B . . . Inner surface (housing)
101$c$ . . . Pressing part
101$c$B . . . Pressing part
101$d$ . . . First stop ring groove
101$d$B . . . Second stop ring groove
101$e$ . . . First indicator ring groove
101$e$B . . . First stop ring groove
101$f$ . . . First tapered surface
101$g$ . . . Second tapered surface
101$g$B . . . Second tapered surface
101$h$ . . . Watertight O-ring
101$i$ . . . Third stop ring groove A
101$n$ . . . Inner hole
101$n$B . . . Inner hole
102 . . . Retainer
102B . . . Retainer
102P1 . . . Combination of pawl and support
102P2 . . . Combination of pawl and support
102$c$ . . . Connector
102$c$B . . . Connector
102$c$B1 . . . First section
102$c$B2 . . . Second section
102$c$B3 . . . Third section
102$n$ . . . Pawl
102$n$B . . . Pawl
102$n$B1 . . . Pawl
102$n$B2 . . . Pawl
102$n$Bb . . . Base
102$n$Br . . . Recess
102$n$Bt . . . Tip
102$s$ . . . Support
102$s$B . . . Support
102$s$B1 . . . Support
102$s$B2 . . . Support
103 . . . Fireproof gasket
103B . . . Fireproof gasket
104 . . . Gasket
104B . . . Gasket
104$s$ . . . Support fitting
105 . . . Pressure ring
105B . . . Inner tube
105 TB . . . Groove part
105$a$ . . . Second stop ring groove
105$a$B . . . Third stop ring groove
105$b$ . . . Second indicator ring groove
105$h$B . . . Watertight O-ring groove
105$k$B . . . Indicator housing
106 . . . Stop ring
106B . . . Stop ring
107 . . . Watertight O-ring
107B . . . Watertight O-ring
108 . . . Indicator ring
108B . . . Indicator member
109 . . . Third stop ring
110 . . . Elastic member
110B . . . Elastic member
111 . . . Cover member
111D . . . Third stop ring groove B
111H . . . Inner hole
111HB . . . Large inner diameter section of cover member
111HC . . . Step section of cover member
111HM . . . Middle inner diameter section of cover member
111HS . . . Small inner diameter section of cover member
111T . . . Groove part
112 . . . Watertight gasket
112B . . . Watertight gasket
114B . . . Movable piece
115B . . . Compressive member
200 . . . Flexible pipe
210 . . . Coating resin
220 . . . Corrugated pipe
221 . . . Peak
222 . . . Valley
300 . . . Conventional pipe joint
301 . . . Conventional pipe joint body 302 . . . Conventional retainer
303 . . . Conventional fireproof gasket
304 . . . Conventional gasket
305 . . . Conventional pressure ring
310 . . . Conventional elastic member
314 . . . Movable piece
400 . . . Flexible pipe
A1 . . . Arrow indicating direction of pulling out flexible pipe
A2 . . . Arrow indicating direction of pressing pressure ring with elastic member
A10 . . . Arrow indicating direction of torsion received by first section
A20 . . . Arrow indicating direction of bending force received by second section
Am . . . Arrow indicating displacement of indicator ring
An . . . Arrow indicating direction of rotation of pawl
As . . . Arrow indicating direction of rotation of support
CA . . . Center axis
D1 . . . Direction along center axis of retainer
D2 . . . Outward direction from center axis of retainer
D3 . . . Circumferential direction of ring of retainer
Dc1 . . . Arrow indicating direction of expansion of first section
Dc2 . . . Arrow indicating direction of expansion of second section
EB . . . Large outer diameter section
ED102 . . . Outer diameter of circular tube defined by outer peripheries of plurality of supports
ES . . . Small outer diameter section
HB . . . Large inner diameter section
HBB . . . Large inner diameter section
HC . . . Step section
HCB . . . Step section
HMB . . . Middle inner diameter section
HS . . . Small inner diameter section
HSB . . . Small inner diameter section
ID101 . . . Inner diameter of pipe joint body in area where support of retainer is housed
L1 . . . Line of intersection between plane including center axis and outer surface of pawl
L2 . . . Line of intersection between plane including center axis and outer surface of support
RL . . . Relative distance between retainer and elastic member
Y . . . Direction of pressing gasket with pressing part
θ . . . Angle of first tapered surface

DETAILED DESCRIPTION

A. First Example

A1. Configuration of Example

Figure 2:
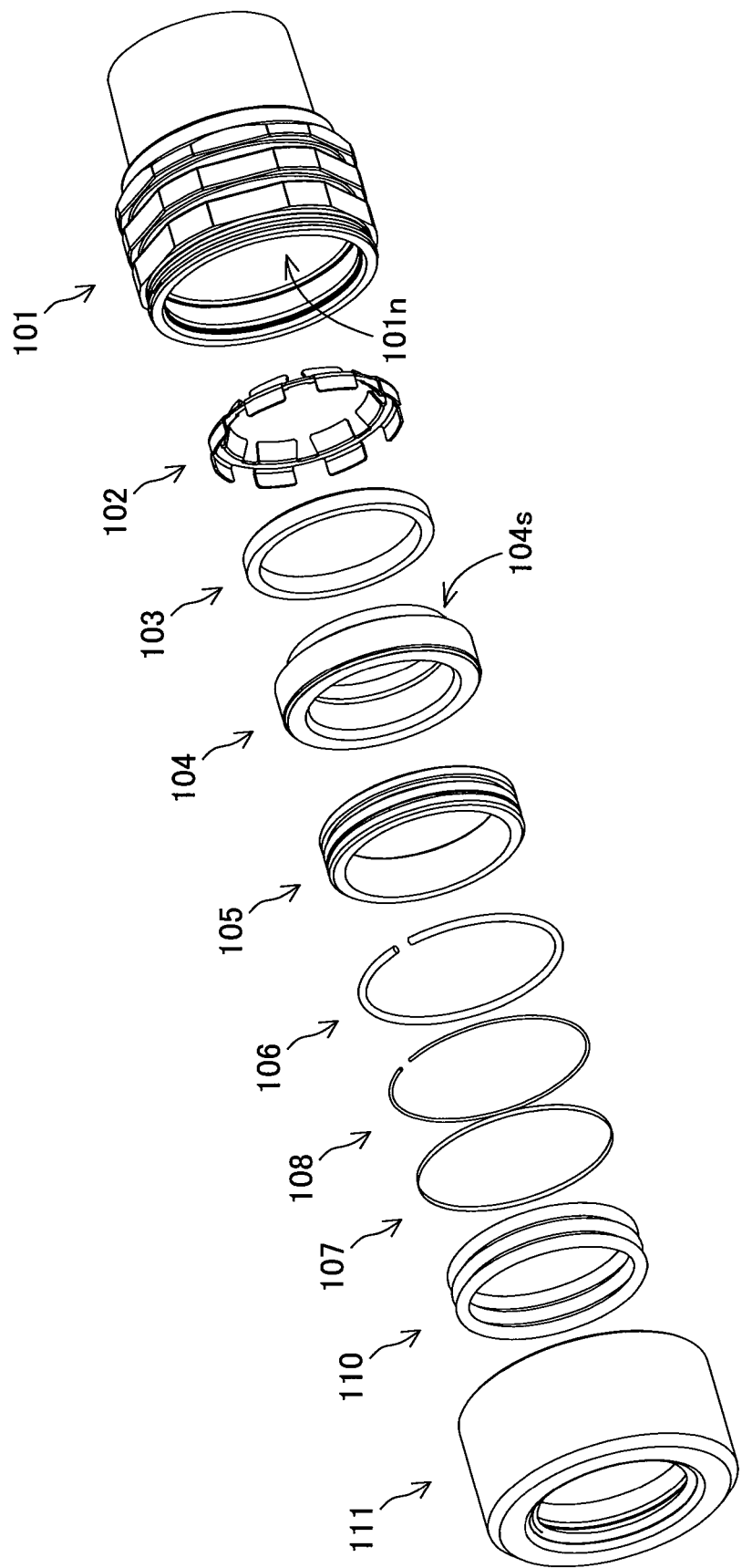
FIG. 2 is an exploded perspective view showing the pipe joint.
Figure 3:
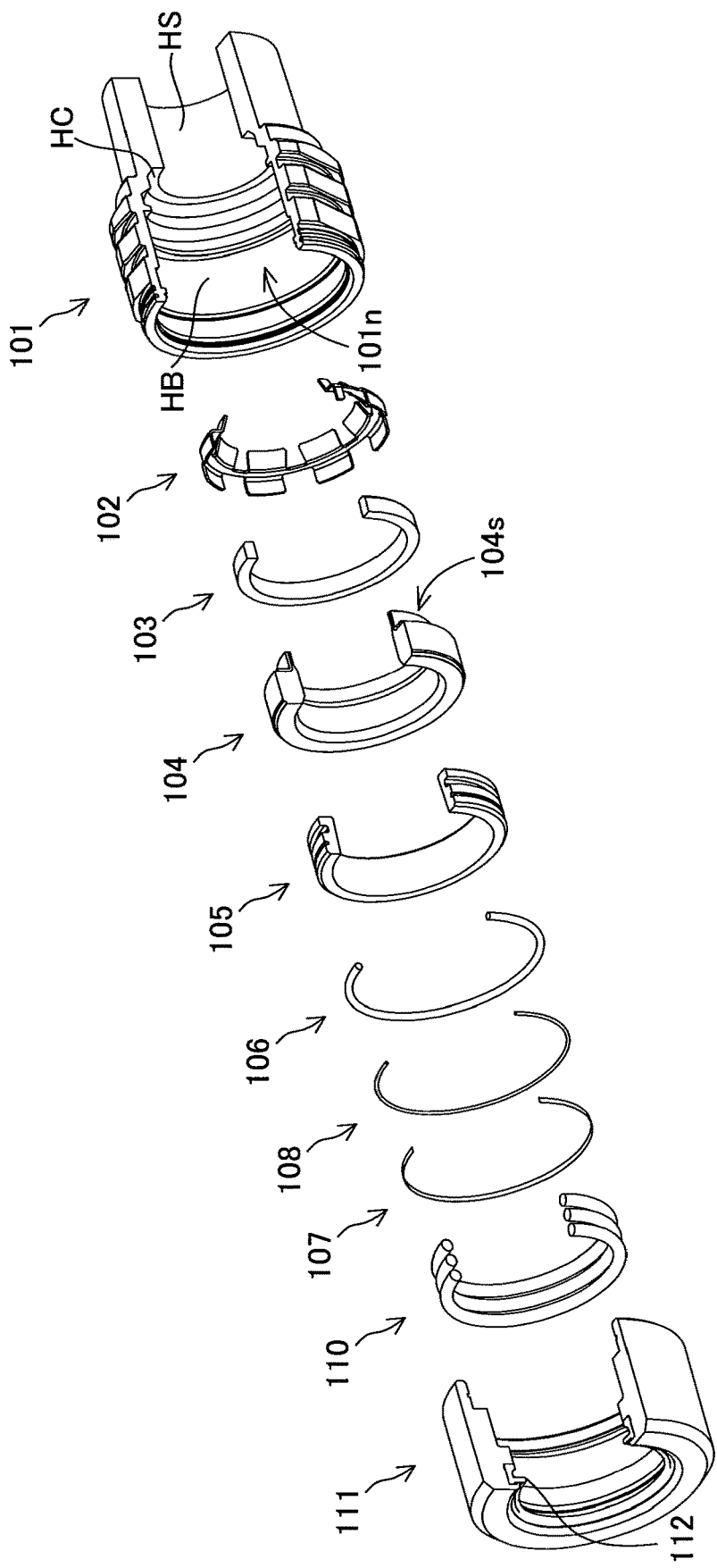
FIG. 3 is a view showing the section of the exploded perspective view in FIG. 2.

FIG. 1 is a partial sectional side view of a pipe joint 100 according to an example. FIG. 2 is an exploded perspective view showing the pipe joint 100. FIG. 3 is a view showing the section of the exploded perspective view of the pipe joint 100.

The pipe joint 100 includes a pipe joint body 101, a retainer 102, a fireproof gasket 103, a gasket 104, a pressure ring 105, a stop ring 106, a watertight O-ring 107, a third stop ring 109, an indicator ring 108, an elastic member 110, a cover member 111, and a watertight gasket 112. These members are basically arranged in this order to form the pipe joint 100.

(a) Pipe Joint Body

Figure 4:
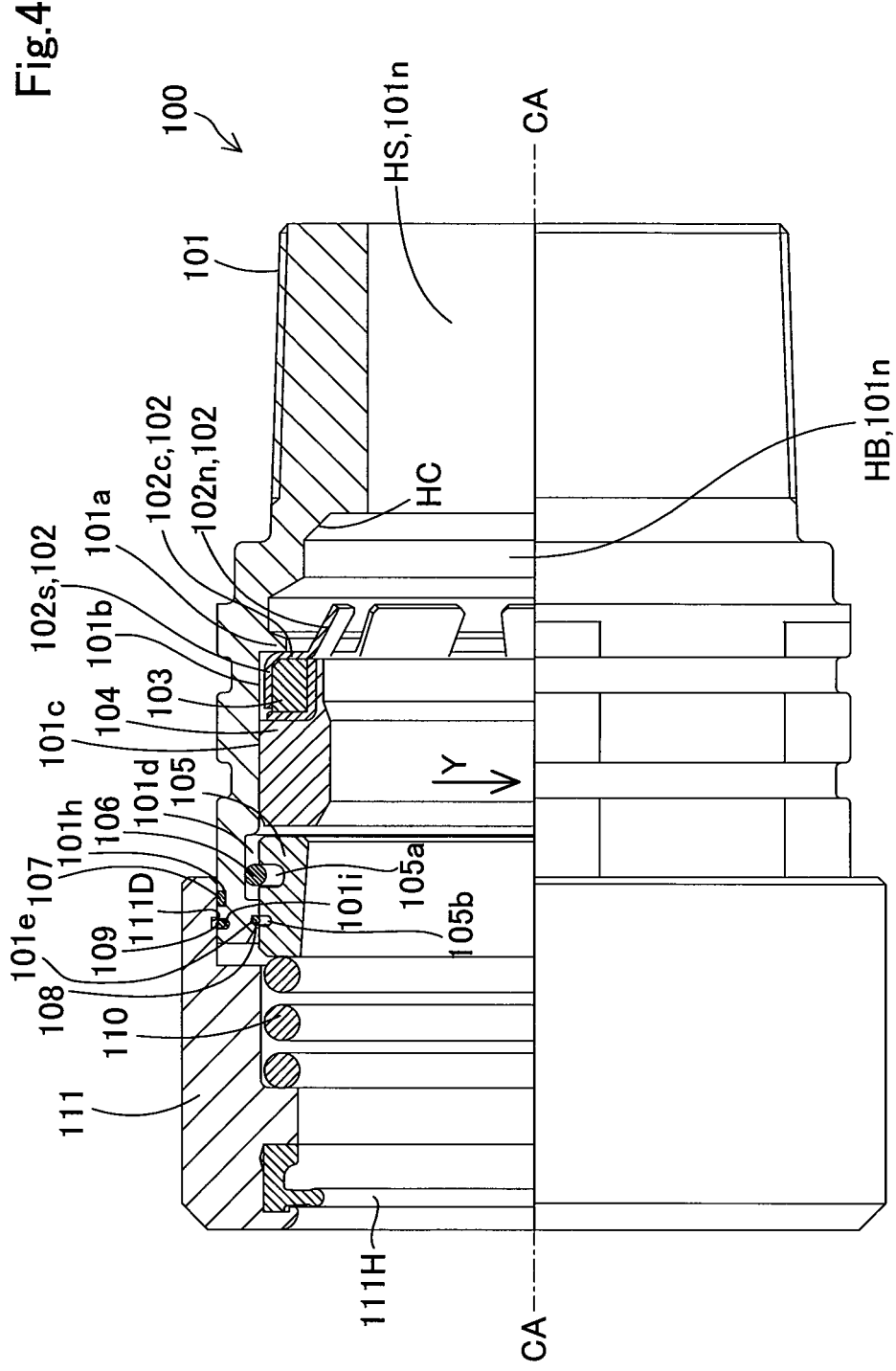
FIG. 4 is a partial sectional side view showing the pipe joint in a state before construction.

FIG. 4 is a partial sectional side view showing the pipe joint in a state before construction. The pipe joint body 101 has an approximately pipe-like shape (see FIG. 2). The pipe joint body 101 has a pipe inner hole 101n in which a tip of a flexible pipe 200 is to be received (see FIG. 1). The pipe joint body 101 is made of a copper alloy such as brass.

The inner hole 101n of the pipe joint body 101 includes a small inner diameter section HS and a large inner diameter section HB arranged in a direction of a pipe center axis and centered at the same center axis CA. The inner diameter of the small inner diameter section HS is less than that of the flexible pipe 200 to be inserted into the pipe joint body 101. The inner diameter of the large inner diameter section HB is greater than that of the small inner diameter section HS and greater than the outer diameter of the flexible pipe 200 to be inserted into the pipe joint body 101. A step section HC located between the small inner diameter section HS and the large inner diameter section HB also functions as a receiving part for receiving a tip of the flexible pipe 200 to be inserted into the pipe joint body 101. The step section HC is also called a receiving part. The step section HC is used for limiting the amount of insertion of the flexible pipe.

The large inner diameter section HB houses therein the retainer 102, the fireproof gasket 103, the gasket 104, the pressure ring 105, the stop ring 106, and the indicator ring 108. The large inner diameter section HB includes a pressing part 101c contacting the gasket 104 on the outer periphery of the gasket 104 and pressing the gasket 104 in a Y direction at a surface of the contact with the gasket 104.

Figure 5:
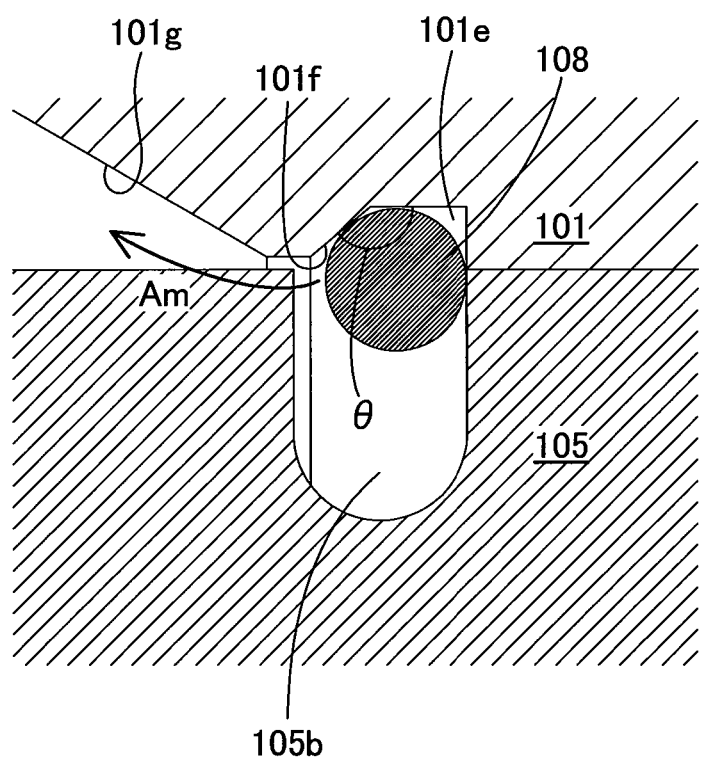
FIG. 5 is a partial sectional side view showing a part of FIG. 4.

FIG. 5 is a partial sectional side view showing a part of FIG. 4. The large inner diameter section HB includes a protrusion 101a, an inner surface 101b, the pressing part 101c, a first stop ring groove 101d, a first indicator ring groove 101e, and a second tapered surface 101g arranged in this order in a direction of moving away from the small inner diameter section HS, namely, toward an X negative direction (see FIGS. 4 and 5).

As shown in FIG. 4, the protrusion 101a protrudes from an inner wall of the large inner diameter section HB toward the center axis CA of the large inner diameter section HB. The protrusion 101a supports the retainer 102 pressed through the elastic member 110 toward an X positive direction (see FIG. 1). The first stop ring groove 101d is a groove having a width greater than the thickness of the stop ring 106 along the center axis CA as viewed in the direction along the center axis CA. The first stop ring groove 101d has a depth with which a part of the stop ring 106 on its outer peripheral side is housed. The first stop ring groove 101d houses the stop ring 106.

The flexible pipe 200 is inserted into the pipe joint 100 such to provide conformity between the center axis CA of the inner hole 101n of the pipe joint body 101 and the center axis of the flexible pipe 200. In FIG. 1, a direction in which the flexible pipe is inserted is expressed as the X positive direction. The X direction is parallel to the center axis CA of the inner hole 101n of the pipe joint body 101.

As shown in FIG. 5, the first indicator ring groove 101e is a groove having a width slightly greater than the thickness of the indicator ring 108 along the center axis CA as viewed in the direction along the center axis CA. The first indicator ring groove 101e has a depth with which a part of the indicator ring 108 on its outer peripheral side is housed. The inner wall of the first indicator ring groove 101e closer to the small inner diameter section HS is substantially vertical to the bottom surface of the first indicator ring groove 101e. The first indicator ring groove 101e has a first tapered surface 101f. The first tapered surface 101f is arranged at an angle θ greater than 90° relative to the bottom surface of the first indicator ring groove 101e. The first tapered surface 101f has a shape that is reduced in inner diameter toward the X negative direction.

The second tapered surface 101g is continuous with the first tapered surface 101f through a surface parallel to the center axis CA and has a shape that is increased in inner diameter toward the X negative direction (see FIG. 5).

As shown in FIG. 4, a part of the outer surface of the pipe joint body 101 corresponding to the large inner diameter section HB is provided with a watertight O-ring groove 101h and a third stop ring groove A arranged in this order toward the X negative direction. The third stop ring groove A is expressed by a sign 101i. The pipe joint body 101 is partially housed in the cover member 111. The watertight O-ring groove 101h and the third stop ring groove A 101i are provided on the outer surface of the pipe joint body 101 housed in the cover member 111. The watertight O-ring groove 101h is a groove having a width slightly greater than the thickness of the watertight O-ring 107 along the center axis CA as viewed in the direction along the center axis CA. The watertight O-ring groove 101h houses the watertight O-ring 107. The watertight O-ring groove 101h has an opening closed by the cover member 111. The third stop ring groove A 101i is a groove having a width slightly greater than the thickness of the third stop ring 109 along the center axis CA as viewed in the direction along the center axis CA. The third stop ring groove A 101i houses a part of the third stop ring 109 on its inner peripheral side. The third stop ring groove A 101i has an opening closed by the cover member 111.

(b) Retainer

Figure 6:
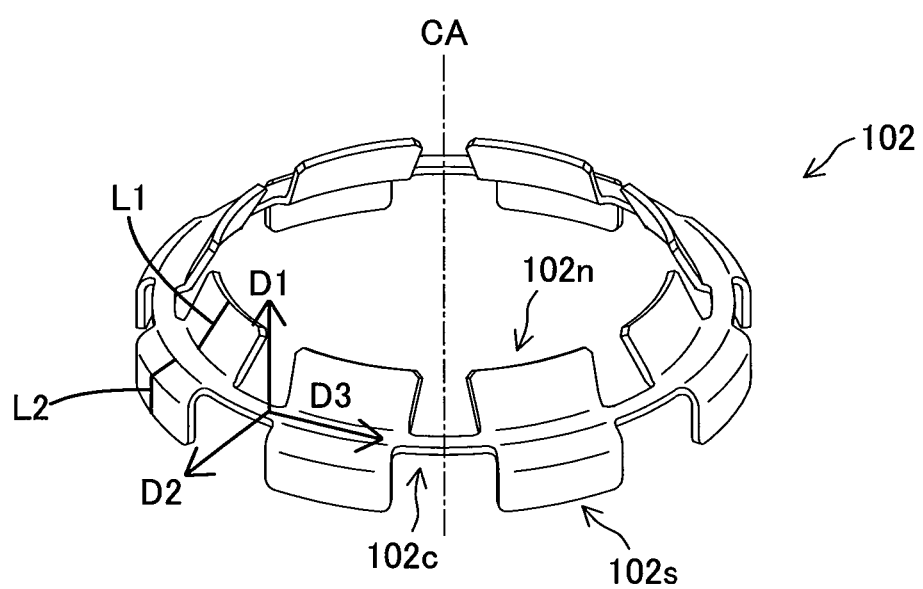
FIG. 6 is a perspective view showing a retainer.

FIG. 6 is a perspective view showing the retainer 102. The retainer 102 has a ring-like shape. The retainer 102 is used in the pipe joint 100. The retainer 102 is a member to retain a corrugated pipe 220 of the flexible pipe 200 to be inserted into the pipe joint 100. The retainer 102 is made of an elastically deformable material such as stainless steel. The retainer 102 is arranged in the large inner diameter section HB of the pipe joint body 101. The retainer 102 includes pawls 102n, connectors 102c, and supports 102s. These pawls 102n get into a valley 222 of the corrugated pipe 220 formed in a corrugated pattern in the axis direction. These supports 102s are continuous with corresponding ones of the pawls 102n and contact the inner surface of the pipe joint body 101.

The pawls 102n are plate-like members evenly spaced in a circumferential direction inside the pipe joint body 101 and protruding toward the small inner diameter section HS inside the pipe joint body 101, namely, toward the X positive direction. The supports 102s are continuous with the corresponding pawls 102n as viewed in the direction of the center axis of the ring corresponding to the approximate shape of the retainer 102. The ring showing the approximate shape of the retainer 102 will hereinafter be called a ring of the retainer 102. The center axis of the ring of the retainer 102 is the same as the center axis CA of the pipe joint body (see FIG. 6). The supports 102s are plate-like members protruding in a direction parallel to the center axis CA of the pipe joint body, which is a direction of moving away from the pawls 102n. The supports 102s are supported by the inner surface 101b of the large inner diameter section HB. The connectors 102c are members connecting the pawls 102n and the supports 102s in a plurality of combinations in a peripheral direction inside the pipe joint body 101. When the retainer 102 is arranged in the large inner diameter section HB of the pipe joint body 101, the connectors 102c are supported by the protrusion 101a of the pipe joint body 101 (see a central area in FIG. 4). The retainer 102 is configured such to rotate the supports 102s toward the direction of the inner surface 101b of the pipe joint body 101 and to rotate the pawls 102n toward a direction of the outer periphery of the flexible pipe 200 about the connector 102c.

In three-dimensional space, directions orthogonal to each other are defined as a first direction D1, a second direction D2, and a third direction D3 (see FIG. 6). The first direction D1 is a direction that makes the external dimension of the connector 102c minimum defined from end to end in this direction. Of the second direction D2 and the third direction D3, a direction that makes the external dimension of the connector 102c second smallest after the dimension in the first direction D1 is the second direction D2. Of the first direction D1, the second direction D2, and the third direction D3, the remaining direction is the third direction D3 (see FIG. 6).

In this example, the dimension of the connector 102c defined in the first direction D1 corresponds to the thickness of the connector 102c. The dimension of the connector 102c defined in the second direction D2 corresponds to the dimension in a radial direction of the retainer 102. The dimension of the connector 102c defined in the third direction D3 corresponds to the dimension in a peripheral direction of the retainer 102. A line of intersection between a plane including the center axis CA and an outer surface of the pawl 102n is defined as L1. A line of intersection between the plane including the center axis CA and an outer surface of the support 102s is defined as L2 (see FIG. 6). The thickness of the connector 102c is substantially the same as those of the pawl 102n and the support 102s. The dimension of the connector 102c defined in the second direction D2 is less than L1 and L2. In the present description, this is expressed by the phrase that the connector 102c is thinner than the pawl 102n and the support 102s. The pawl 102n, the support 102s, and the connector 102c are made of the same material. For this reason, the connector 102c thinner than the pawl 102n and the support 102s is configured to have lower strength than the pawl 102n and the support 102s and to be elastically deformed more easily than the pawl 102n and the support 102s.

(c) Fireproof Gasket

As shown in FIGS. 2 and 3, the fireproof gasket 103 is a ring-like member having a rectangular section. The fireproof gasket 103 is a member that ensures sealing properties between the pipe joint 100 and the flexible pipe 200 when heat is applied to the pipe joint 100 to melt the gasket 104. The fireproof gasket 103 is arranged inside the retainer 102 (see FIG. 4). More specifically, the fireproof gasket 103 is arranged to bring one side of the rectangular section into contact with a corresponding connector 102c and support 102s of the retainer 102.

If the flexible pipe 200 is exposed to high temperature on the occurrence of fire, for example, the gasket 104 is burned down. At this time, the fireproof gasket 103 expands with heat to fill space between the pressure ring 105 and the retainer 102. The filling fireproof gasket 103 seals the flexible pipe 200 along its outer diameter, thereby preventing gas leakage and spreading of damage on the occurrence of the fire.

(d) Gasket

As shown in FIGS. 2 and 3, the gasket 104 is a ring-like member having an L-shaped section. The gasket 104 receives the flexible pipe 200. The gasket 104 is an elastic member made of rubber, for example. As shown in FIG. 1, an end surface of the gasket 104 is compressed between the pressure ring 105 and the pipe joint body 101 to increase pressure of a contact surface with the corrugated pipe 220, thereby enhancing the properties of sealing with the corrugated pipe 220. The outer diameter of the gasket 104 is set slightly greater than the inner diameter of the inner periphery of the pipe joint body 101. The inner diameter of the gasket 104 is set slightly less than the outer diameter of the corrugated pipe 220. The gasket 104 is provided with a support fitting 104s protruding in the X positive direction. The support fitting 104s has an outer peripheral surface on which the fireproof gasket 103 is retained. By doing so, the support fitting 104s suppresses displacement of the fireproof gasket 103.

(e) Pressure Ring

As shown in FIGS. 2 and 3, the pressure ring 105 is a ring-like member having an approximately rectangular section. The pressure ring 105 is arranged between the elastic member 110 and the gasket 104. The pressure ring 105 presses the gasket 104 after insertion of the flexible pipe 200. As a result of displacement of the pressure ring 105, the pressure ring 105 may take a position of overlapping a part of the pipe joint body 101 and a position overlapping the cover member 111. As shown in FIG. 4, the pressure ring 105 has an outer surface provided with a second stop ring groove 105a and a second indicator ring groove 105b arranged in this order toward the X negative direction. The second stop ring groove 105a has a width slightly greater than the thickness of the stop ring 106 along the center axis CA as viewed in the direction along the center axis CA. The second stop ring groove 105a is a part housing a part of the stop ring 106 and has a depth with which the part of the stop ring 106 on its outer peripheral side is housed.

As shown in FIGS. 4 and 5, the second indicator ring groove 105b houses the indicator ring 108 before insertion of the flexible pipe 200. The second indicator ring groove 105b is a groove having a width slightly greater than the thickness of the indicator ring 108 in the direction of the center axis CA as viewed in the direction along the center axis CA. The second indicator ring groove 105b is a groove having a depth with which the indicator ring 108 is housed.

(f) Stop Ring

As shown in FIGS. 2 and 3, the stop ring 106 is a ring-like member having a circular section. More specifically, the stop ring 106 is a C-shaped ring made of metal. As shown in FIG. 4, a part of the stop ring 106 on its inner peripheral side is arranged in the second stop ring groove 105a. A part of the stop ring 106 on its outer peripheral side is arranged in the first stop ring groove 101d. The stop ring 106 latches the pipe joint body 101 and the pressure ring 105 with each other between the first stop ring groove 101d and the second stop ring groove 105a. The stop ring 106 limits displacement of the pressure ring 105 toward the X direction.

(g) Watertight O-Ring

As shown in FIGS. 2 and 3, the watertight O-ring 107 is a ring-like member having a circular section. The watertight O-ring 107 is arranged in the watertight O-ring groove 101h provided to a part of the pipe joint body 101 on its outer diameter side (see FIG. 4). The watertight O-ring 107 mainly functions to prevent entry of liquid from a connection between the pipe joint body 101 and the cover member 111. The watertight O-ring 107 is made of rubber, and a material used for the watertight O-ring 107 is ethylene-propylene-diene rubber (EPDM) or nitrile-butadiene rubber (NBR), for example.

(h) Indicator Ring

As shown in FIGS. 2 and 3, the indicator ring 108 is a ring-like member having a circular section. The indicator ring 108 is a C-shaped ring made of metal having elasticity. The indicator ring 108 is configured to be reducible in outer diameter in response to receipt of external force. In a no-load state, the outer diameter of the indicator ring 108 is greater than that of the pipe joint body 101 (see FIG. 1). The indicator ring 108 functions as an indicator for checking completion of connection of the flexible pipe 200 to the pipe joint 100. The indicator ring 108 may be placed in a state in which the indicator ring 108 is at a position overlapping the pipe joint body 101 and is housed in the first indicator ring groove 101e and the second indicator ring groove 105b, and a state in which the indicator ring 108 is at a position overlapping the cover member 111 and is located outside the first indicator ring groove 101e and the second indicator ring groove 105b (see FIGS. 4 and 1).

Before insertion of the flexible pipe 200 into the pipe joint 100, the indicator ring 108 is between the first indicator ring groove 101e of the pipe joint body 101 and the second indicator ring groove 105b of the pressure ring 105 (see FIG. 4). After insertion of the flexible pipe 200, the indicator ring 108 is displaced along the first tapered surface 101f and the second tapered surface 101g to come into abutting contact with the cover member 111 (see FIG. 1).

The indicator ring 108 is given a different color from an adjacent member to be checked visually through the cover member 111. The indicator ring 108 may be blue. The indicator ring 108 further functions to latch the pipe joint body 101 and the pressure ring 105 with each other between the first indicator ring groove 101e and the second indicator ring groove 105b where the pipe joint body 101 and the pressure ring 105 abut on each other. Accordingly, the indicator ring 108 also functions as a second stop ring.

(i) Third Stop Ring

The third stop ring 109 is a ring-like member having a circular section (see FIG. 4). More specifically, the third stop ring 109 is a C-shaped ring made of metal. A part of the third stop ring 109 on its inner peripheral side is arranged in the third stop ring groove A 101i. A part of the third stop ring 109 on its outer peripheral side is arranged in a third stop ring groove B. The third stop ring groove B is expressed by a sign 111D. As shown in FIG. 4, the third stop ring 109 latches the pipe joint body 101 and the cover member 111 with each other.

(j) Elastic Member

The elastic member 110 is a coil spring. The elastic member 110 is made of a member expandable and compressible in the X direction and is configured to exert pressing force in a compressed state. As shown in FIG. 4, before fitting of the flexible pipe 200, the elastic member 110 is retained in the compressed state by a step section 111HC of the cover member 111. The elastic member 110 compresses the gasket 104 through the pressure ring 105 to enhance the properties of sealing using the flexible pipe 200 provided by the gasket 104.

(k) Cover Member

As shown in FIGS. 2 and 3, the cover member 111 is a ring-like member. The cover member 111 is made of a transparent material such as acrylic resin. The cover member 111 works together with the pipe joint body 101 to fix the positions of opposite ends including the end of the retainer 102 in the X positive direction and the end of the elastic member 110 in the X negative direction.

Figure 7:
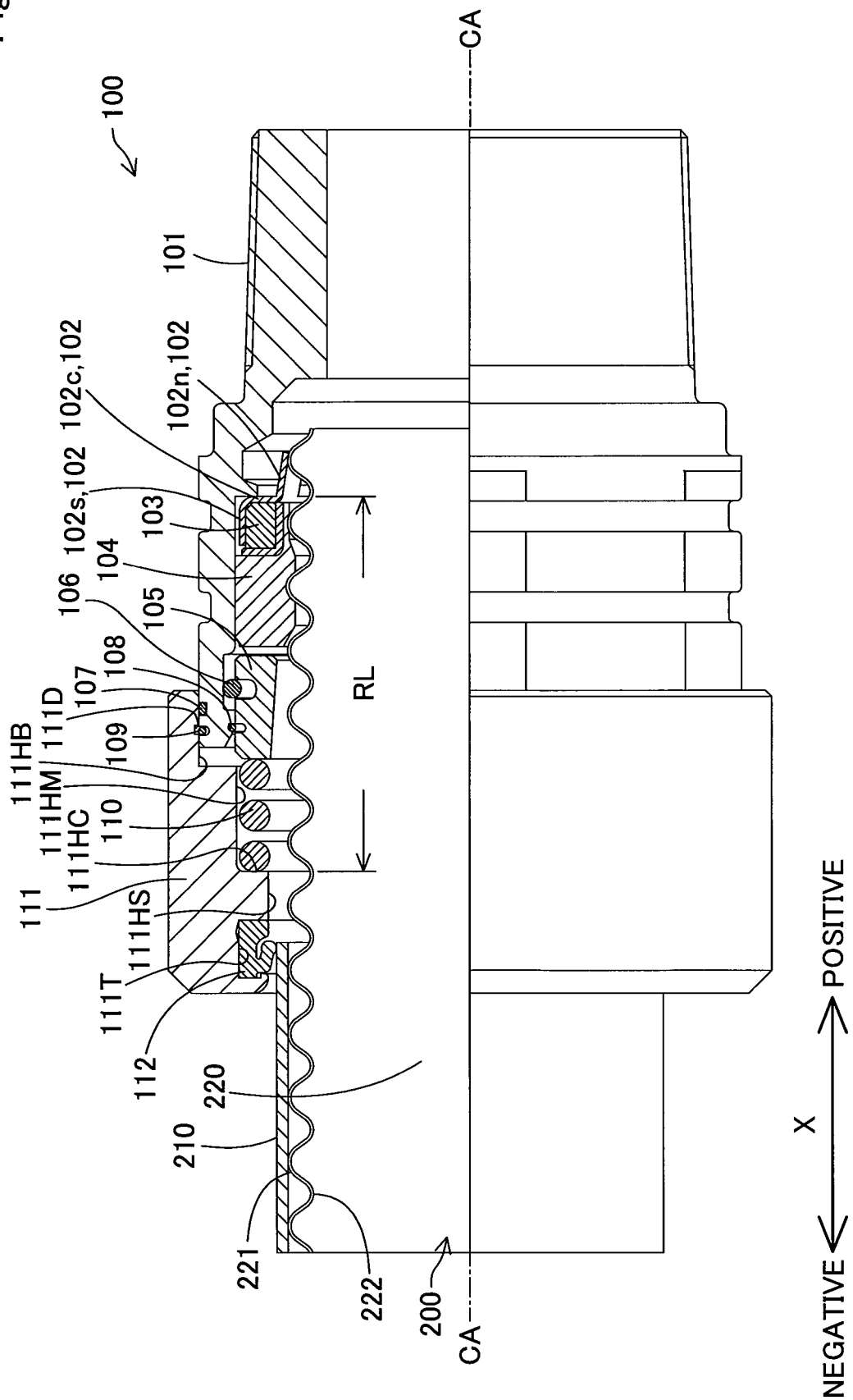
FIG. 7 is a partial sectional side view showing a state in which a flexible pipe is being inserted into the pipe joint.

As shown in FIG. 7, the cover member 111 includes a large inner diameter section 111HB of the cover member 111, a middle inner diameter section 111HM of the cover member 111, and a small inner diameter section 111HS of the cover member 111 arranged in this order in a direction of moving away from the pipe joint body 101 and in the direction along the center axis CA. FIG. 7 is a partial sectional side view showing a state in which the flexible pipe 200 is being inserted into the pipe joint 100. To facilitate understanding of the technique, FIG. 7 will be used appropriately instead of FIG. 4 for explaining the cover member 111.

The large inner diameter section 111HB of the cover member 111 houses a part of a section of the pipe joint body 101 on its tip side corresponding to the large inner diameter section HB. The large inner diameter section 111HB of the cover member 111 has an inner diameter substantially equal to the outer diameter of the section of the pipe joint body 101 corresponding to the large inner diameter section HB.

The large inner diameter section 111HB of the cover member 111 includes the third stop ring groove B 111D. The third stop ring groove B 111D is a groove having a width slightly greater than the thickness of the third stop ring 109 along the center axis CA as viewed in the direction along the center axis CA. The third stop ring groove B 111D houses a part of the third stop ring 109 on its outer peripheral side. In a state after the flexible pipe 200 is attached to the pipe joint 100, the large inner diameter section 111HB of the cover member 111 supports the indicator ring 108 in an area closer to the middle inner diameter section 111HM of the cover member 111 than the first indicator ring groove 101e (see FIG. 1). As the cover member 111 is transparent, the indicator ring 108 in this state is visually recognizable from outside the cover member 111.

The middle inner diameter section 111HM of the cover member 111 has an inner diameter less than that of the large inner diameter section 111HB of the cover member 111 and greater than the outer diameter of the elastic member 110. The middle inner diameter section 111HM of the cover member 111 houses the elastic member 110.

The small inner diameter section 111HS of the cover member 111 has an inner diameter less than that of the middle inner diameter section 111HM of the cover member 111 and greater than the outer diameter of the flexible pipe 200 to be inserted into the cover member 111. The step section 111HC of the cover member 111 connecting the small inner diameter section 111HS of the cover member 111 and the middle inner diameter section 111HM of the cover member 111 receives one end of the elastic member 110.

The small inner diameter section 111HS of the cover member 111 has an inner hole 111H of the cover member 111 including a groove part 111T of the cover member 111. The groove part 111T of the cover member 111 is a groove having a width slightly less than the thickness of the watertight gasket 112 along the center axis CA as viewed in the direction along the center axis CA. The groove part 111T of the cover member 111 houses a part of the watertight gasket 112 on its outer peripheral side.

(l) Watertight Gasket

As shown in FIGS. 1 and 3, the watertight gasket 112 is a ring-like member having an approximately L-shaped section. The watertight gasket 112 is made of rubber or resin. The watertight gasket 112 is housed in the groove part of the inner surface of the cover member 111 at an end on the opposite side to an end where the cover member 111 abuts on the pipe joint body 101. The watertight gasket 112 also prevents liquid from entering from outside through a gap between the pipe joint body 101 and the flexible pipe 200. A distance between a tip of the corrugated pipe 220 where the pawl 102n gets into the valley 222 and the watertight gasket 112 corresponds to a distance covering eight peaks of the corrugated pipe 220. This forms engagement of the retainer 102 at the backward valley 222 spaced by one peak of the corrugated pipe 220 to form contact between the gasket 104 and the flexible pipe 200 at a fourth peak (see FIG. 1). Furthermore, the watertight gasket 112 contacts coating resin 210 at a position corresponding to a ninth peak of the corrugated pipe 220. This allows a constructor to remove the coating at any one of peaks from the fourth peak to an eighth peak.

A2. Connecting Work (a) Motion of Inserting Flexible Pipe 200

FIG. 7 is a partial sectional side view showing a state in which the flexible pipe 200 is being inserted into the pipe joint 100. By inserting the corrugated pipe 220 into the pipe joint 100 in the state of FIG. 4 after removing the coating resin 210 to a length corresponding to four peaks to eight peaks from the corrugated pipe 220, the peak 221 corresponding to a first peak is brought into contact with the pawl 102n of the retainer 102 (see FIG. 7).

When the flexible pipe 200 is inserted further into the pipe joint body 101, pressing force applied to the pawl 102n is transmitted to the connector 102c continuous with the pawl 102n and the support 102s. As the connector 102c is thinner than the pawl 102n and the support 102s, the connector 102c deforms elastically before the pawl 102n and the support 102s deform. By inserting the flexible pipe 200 further, pressing force is applied from the flexible pipe 200 to the retainer 102 at which the pawl 102n is displaced in a direction of moving away from the flexible pipe 200 about the displaced connector 102c. In response to this, the support 102s connected to the connector is displaced in a direction of moving away from the inner surface 101b of the pipe joint body 101. Namely, the pawl 102n rotates toward a direction of moving away from the flexible pipe 200 and the support 102s rotates toward a direction of moving away from the inner surface of the pipe joint body about the connector 102c. In other words, at the retainer 102, the pawls 102n and the supports 102s in a plurality of combinations rotate such to expand the plurality of pawls 102n centered at the center axis CA. In response to such elastic deformation, the pawl 102n of the retainer 102 continuously subjected to application of the pressing force from the flexible pipe 200 gets over the peak 221 while being displaced in the radial direction of the inner surface 101b of the pipe joint body 101.

Figure 8:
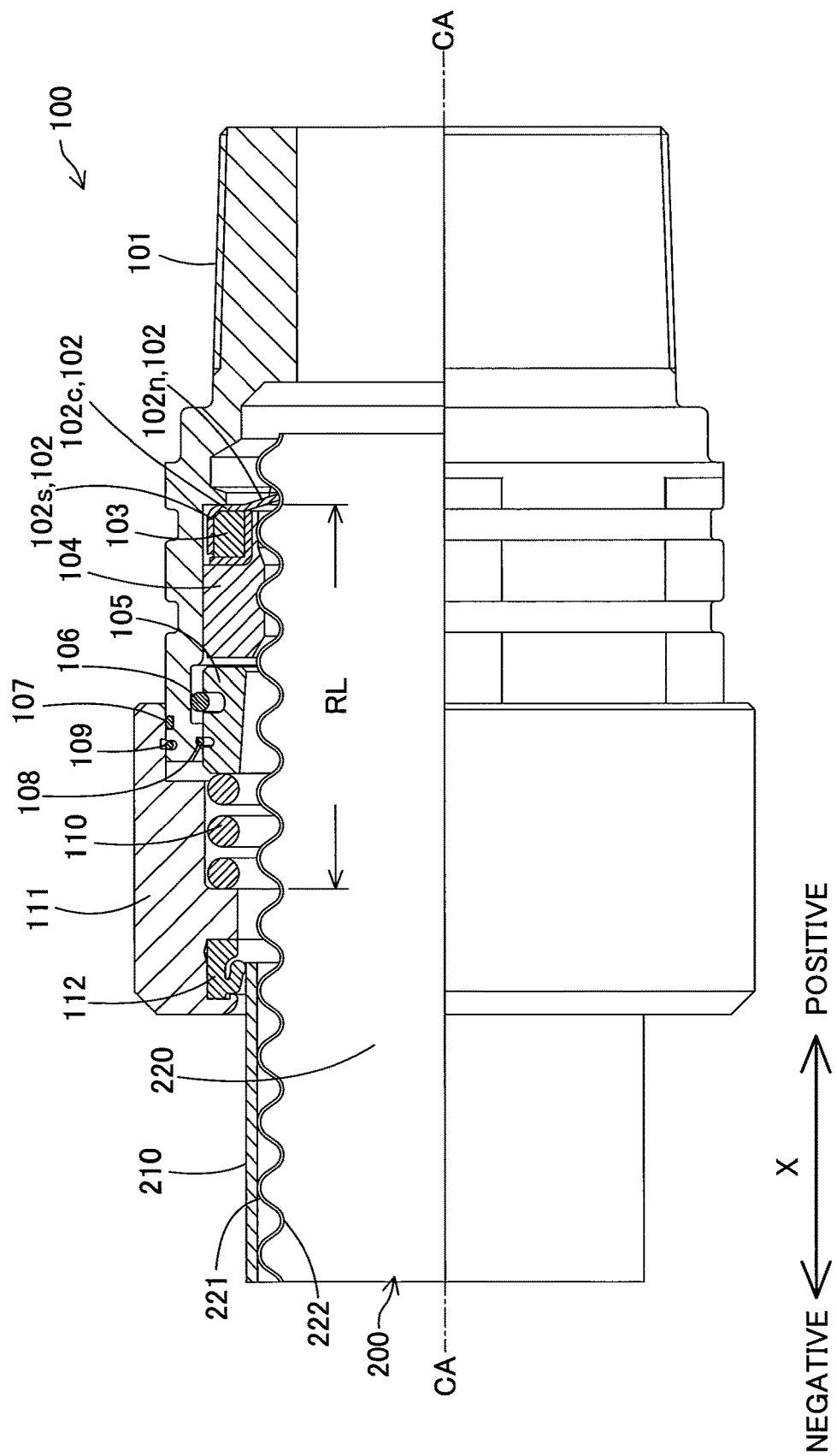
FIG. 8 is a partial sectional side view showing a situation when the retainer is engaged with a valley of a corrugated pipe after insertion of the flexible pipe.

FIG. 8 is a partial sectional side view showing a situation when the retainer 102 is engaged with the valley 222 of the corrugated pipe 220 after insertion of the flexible pipe 200. When further pressing force is applied continuously in the X positive direction to the pawl 102n in the state of FIG. 7, the pawl 102n gets over the peak 221 of the corrugated pipe 220 as shown in FIG. 8. After getting over the peak 221, the pawl 102n receives force from the connector 102c trying to restore its shape before the elastic deformation to be engaged with the valley 222 of the corrugated pipe 220. This allows a constructor to form engagement between the retainer 102 and the flexible pipe 200 only through the motion of inserting the flexible pipe 200 without requiring motions of other members.

The pawl 102n is provided at a position at which the pawl 102n is to be engaged with the corrugated pipe 220 of the flexible pipe 200 at the backward valley 222 spaced by one peak from the tip of the flexible pipe 200 while the amount of insertion of the flexible pipe 200 is limited by the step section HC. By doing so, the engagement between the retainer 102 and the corrugated pipe 220 occurs only once during insertion of the flexible pipe 200. This allows the constructor to reliably sense the connection between the flexible pipe 200 and the pipe joint 100 through one reaction, as compared to when the pawl 102n of the retainer 102 is engaged at a nearby position spaced by a plurality of peaks of the corrugated pipe 220.

(b) Check of Connection of Flexible Pipe 200

Figure 9:
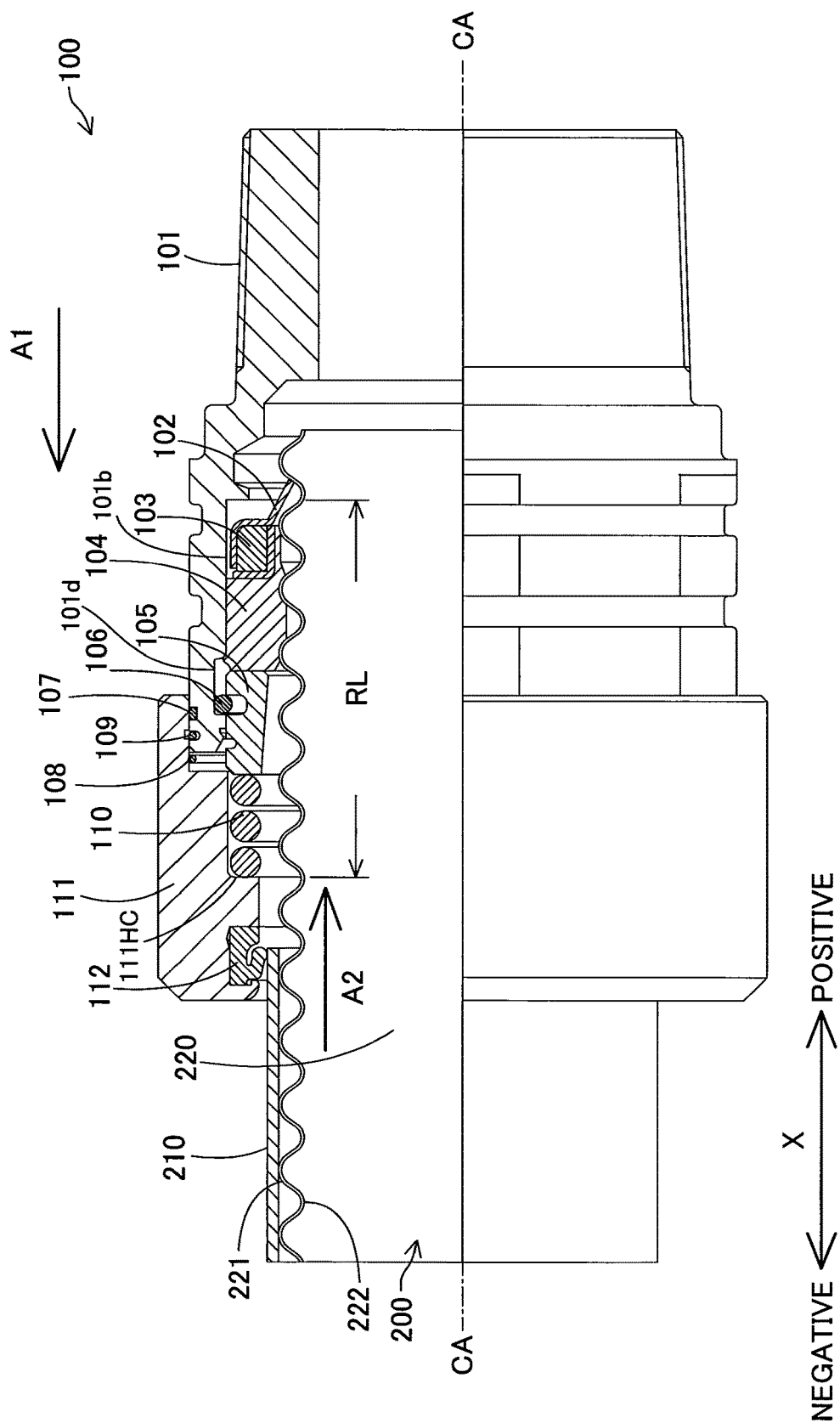
FIG. 9 is a partial sectional side view showing a situation when a constructor makes a motion A1 to pull the flexible pipe after insertion of the flexible pipe.

FIG. 9 is a partial sectional side view showing a situation when the constructor pulls the flexible pipe 200 in a direction of an arrow A1 in FIG. 9 after insertion of the flexible pipe 200. While the pawl 102n of the retainer 102 is inside the valley 222 of the corrugated pipe 220, the constructor pulls the flexible pipe 200 in the X negative direction corresponding to the direction of the arrow A1. In this example, the support 102s and the inner surface 101b of the pipe joint body 101 contacting the support 102s suppress displacement of the pawl 102n.

More specifically, after being displaced, the support 102s contacts the inner surface 101b of the pipe joint body 101 to stop the displacement at a contact surface. Thus, if pulling force is applied to the flexible pipe 200 thereafter, the support 102s supported on the inner surface 101b of the pipe joint body 101 does not cause further displacement. This also prevents the pawl 102n continuous with the support 102s from being displaced further. As a result, the flexible pipe 200 is not pulled out by the application of pulling force substantially equal to the force applied during its insertion. Namely, it becomes possible to achieve both the engagement of the flexible pipe 200 by the application of small force and firm retention of the flexible pipe 200.

The retainer 102 engaged with the valley 222 of the corrugated pipe 220 is displaced in the X negative direction corresponding to the direction of the arrow A1 in FIG. 9. Then, the fireproof gasket 103 pressed by the retainer 102 is also displaced in the X negative direction to press the gasket 104. The pressed gasket 104 is displaced in the X negative direction, and at the same time, presses the pressure ring 105 next to the gasket 104. As the pressure ring 105 is pressed to be displaced in the X negative direction, the indicator ring 108 housed in the second indicator ring groove 105b provided at the surface of contact with the pipe joint body 101 is displaced in the X negative direction. More specifically, the indicator ring 108 is displaced along the first tapered surface 101f and the second tapered surface 101g of the pipe joint body 101 (see an arrow Am in FIG. 5). By doing so, the indicator ring 108 is located at a position overlapping the large inner diameter section 111HB of the cover member 111. Pressing the pressure ring 105 and displacing the pressure ring 105 in the X negative direction also displaces the stop ring 106 in the X negative direction. When the stop ring 106 comes into contact with an end of the first stop ring groove 101d in the X negative direction, the pressure ring 105 is prevented from being displaced further in the X negative direction.

In a state before insertion of the flexible pipe 200, the indicator ring 108 is housed in the second indicator ring groove 105b of the pressure ring 105 and the first indicator ring groove 101e of the pipe joint body 101 (see FIG. 4). The indicator ring 108 in this stage is covered with the pipe joint body 101 so that the indicator ring 108 is not visually recognizable from outside. As a result of implementation of the above-described motion, however, the indicator ring 108 is displaced to the large inner diameter section 111HB of the cover member 111 (see FIG. 9). This allows the constructor to visually recognize the indicator ring 108 through the transparent cover member 111. As a result, it becomes possible to confirm that the flexible pipe 200 is retained by the retainer 102.

(c) Enhancement of Properties of Sealing with Corrugated Pipe 220

A relative distance RL between the retainer 102 and the elastic member 110 is limited by the pipe joint body 101 and the cover member 111 (see FIG. 9). When the elastic member 110 receives pressing force from the pressure ring 105 to come into contact with the step section 111HC of the cover member 111, the elastic member 110 does not cause further displacement in the X negative direction. As shown by an arrow A2, the elastic member 110 presses the pressure ring 105 in the X positive direction. The pressed pressure ring 105 presses the gasket 104.

The gasket 104 pressed by the pressure ring 105 in the X positive direction presses the retainer 102 through the fireproof gasket 103. However, as the motion of the retainer 102 is limited by the protrusion 101a of the pipe joint body 101, the retainer 102 is displaced only to a position at which the retainer 102 contacts the protrusion 101a (see FIG. 1). As a result, the gasket 104 is compressed toward the two X directions by the pressure ring 105 and the fireproof gasket 103.

The gasket 104 pressed in the two X directions tries to deform in a direction vertical to the X directions. However, as a surface of the gasket 104 on its outer diameter side is in contact with the pressing part 101c of the pipe joint body 101, the gasket 104 is prevented from deforming in the intended direction. As a result, a surface of the gasket 104 on its inner diameter side deforms toward the corrugated pipe 220 of the flexible pipe 200. By doing so, the flexible pipe is firmly sealed at its periphery. Furthermore, even on the occurrence of age deterioration of the gasket, application of pressing force from a pressure member to the gasket acting in a direction of insertion of the flexible pipe makes it unlikely that sealing properties will be reduced around the flexible pipe.

A member as a combination of the pressure ring 105 and the elastic member 110 is also called the pressure member. A member as a combination of the pipe joint body 101 and the cover member 111 is also called a fixing member. A member as a combination of the indicator ring 108 and the pressure ring 105 with the second indicator ring groove 105b is also called a fastening member. The cover member 111 is also called a window part. The pipe joint body 101 is also called a wall part. Movement of a member or change in the position of the member is also called displacement. The shape and dimension of the gasket 104 are not illustrated correctly in FIG. 1.

A3. Examples Other than First Example

1) In the above-described example, on the occurrence of pulling force applied to the flexible pipe 200 while the pawl 102n is engaged with the valley 222, the support 102s and the inner peripheral surface of the pipe joint body 101 contacting the support 102s are used for suppressing displacement of the pawl 102n. However, displacement of the pawl may not be suppressed using the support and the inner peripheral surface of the pipe joint body contacting the support. However, it is preferable to prevent displacement of the pawl using any member forming the joint.

2) In the above-described example, the pawl 102n of the retainer 102 is engaged at a nearby position spaced by one peak of the flexible pipe 200. However, the engagement may be formed at a nearby position spaced by two or more peaks. What is required is to form engagement between the pipe joint 100 and the flexible pipe 200.

3) In the above-described example, the connector 102c is made of the same material as the pawl 102n and the support 102s. However, the material of the connector is not limited to the same material as the pawl and the support. What is required for the connector is to be elastically deformed more easily than the pawl and the support. For example, even if the connector is made of a material more rigid than those of the pawl and the support, the connector may be made more deformable than the pawl and the support by performing process on the connector such as boring.

4) In the above-described example, the pipe joint 100 includes the fireproof gasket 103, the gasket 104, the pressure ring 105, the stop ring 106, the indicator ring 108, the watertight O-ring 107, the third stop ring 109, the elastic member 110, the cover member 111, and the watertight gasket 112 arranged in this order toward the X negative direction. However, these members are not required to be arranged in this order. For example, the fireproof gasket may be arranged at the innermost position from the entrance of the pipe joint. Furthermore, one member, or two or more combinations of these members may be provided. For example, only the retainer may be provided. What is preferred is to engage the flexible pipe in an intended manner with the pipe joint.

5) In the above-described example, the relative distance between the pressure ring 105, the elastic member 110, and the retainer 102 is limited by the pipe joint body 101 and the cover member 111. However, the relative distance between the pressure ring, the elastic member, and the retainer may be limited by a member other than the pipe joint body and the cover member. For example, a member of an angular U-shape may be provided in addition to the pipe joint body and the cover member, and this member may be used for limiting the relative distance between the pressure ring, the elastic member, and the retainer.

6) In the above-described example, the interior is viewable through the cover member 111. In this example, a part of the cover member may be non-transparent and the interior may be viewed through a different part of the cover member. What is preferred is that the indicator ring is visually recognizable from outside of the joint.

7) In the above-described example, a distance from the retainer to a peak of the flexible pipe 200 is a distance corresponding to four peaks to eight peaks. However, this difference may be determined in a different way. What is required is to form engagement between the corrugated pipe and the pawl of the retainer.

8) In the above-described example, the relative distance RL between the retainer 102 and the elastic member 110 corresponds to a distance from a surface of contact between the protrusion 101a and the retainer 102 to the step section 111HC of the cover member 111. However, this distance may be determined in a different way. For example, this distance may be a distance from an end of the elastic member in the X positive direction to the surface of contact between the protrusion and the retainer.

B. Second Example

B1. Configuration of Pipe Joint

Figure 10:
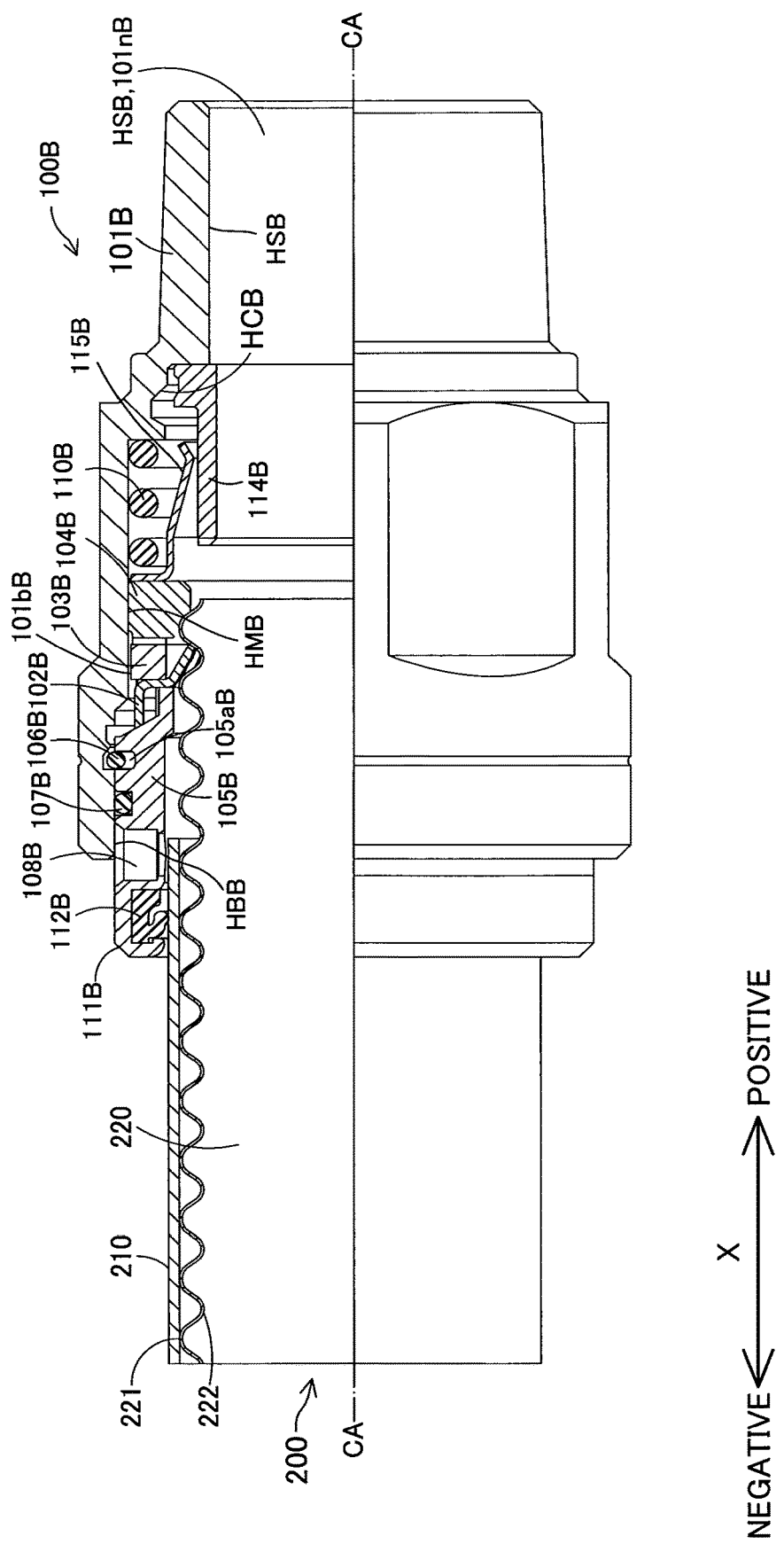
FIG. 10 is a partial sectional side view of a pipe joint according to a second example.

FIG. 10 is a partial sectional side view of a pipe joint 100B according to a second example. In the second example, a structure corresponding to that of the first example will be identified by a sign with "B" added to the end of a sign given to the corresponding structure of the first example.

The pipe joint 100B includes a pipe joint body 101B, a movable piece 114B, a compressive member 115B, an elastic member 110B, a gasket 104B, a fireproof gasket 103B, a retainer 102B, an inner tube 105B, a stop ring 106B, a watertight O-ring 107B, an indicator member 108B, and a watertight gasket 112B. These members are basically arranged in the above-described order to form the pipe joint 100B.

Figure 11:
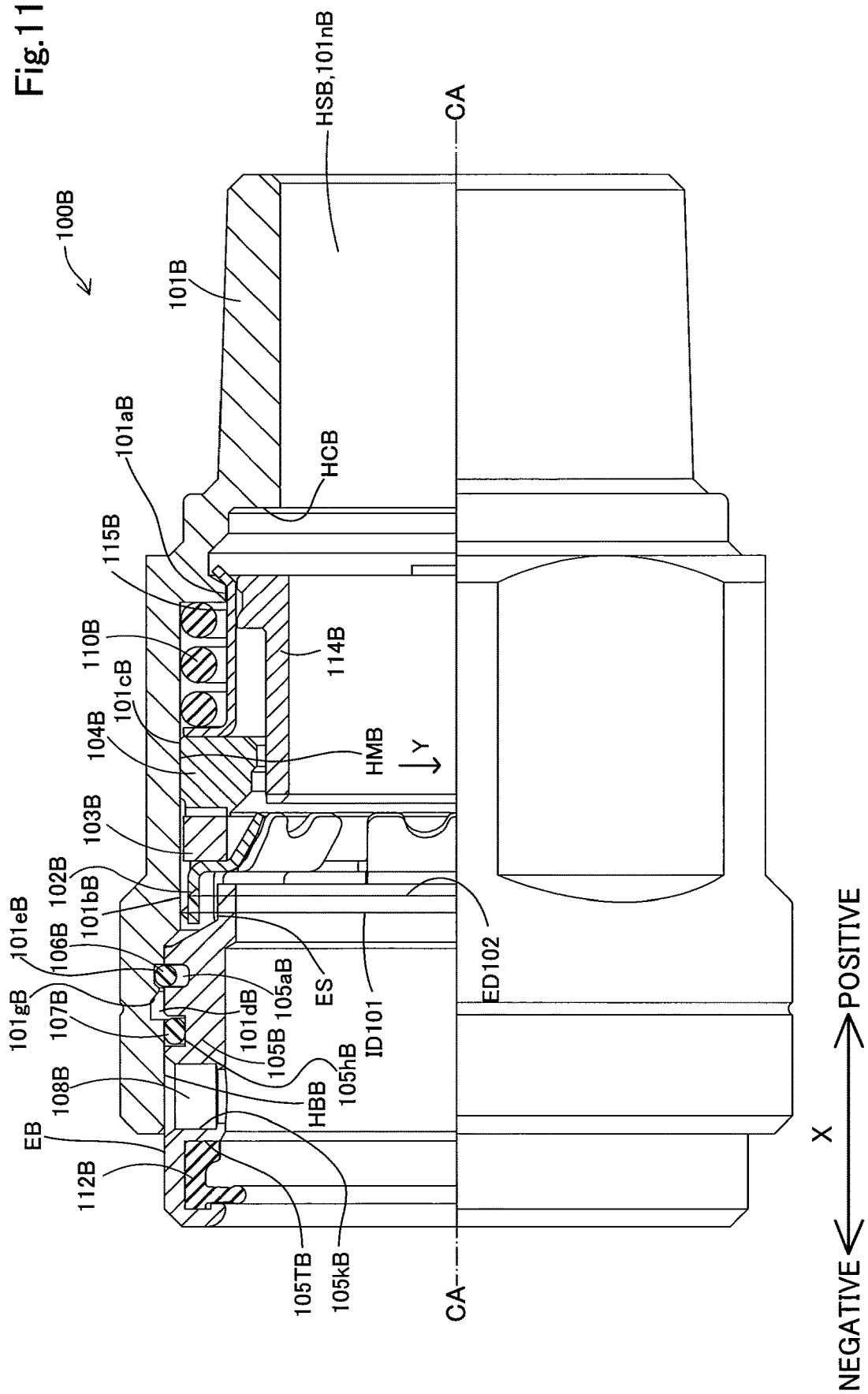
FIG. 11 is a partial sectional side view showing the pipe joint in a state before construction.

FIG. 11 is a partial sectional side view showing the pipe joint in a state before construction. The configuration of the pipe joint 100B in a state before insertion of the flexible pipe 200 will be described first.

The pipe joint body 101B has an approximately pipe-like shape. The pipe joint body 101B has an inner hole 101nB including a small inner diameter section HSB, a middle inner diameter section HMB, and a large inner diameter section HBB arranged in a direction of a pipe center axis and centered at the same center axis CA. The inner diameter of the small inner diameter section HSB is less than that of the flexible pipe 200 to be inserted into the pipe joint body 101B. The inner diameter of the middle inner diameter section HMB is greater than that of the small inner diameter section HSB and greater than the outer diameter of the flexible pipe 200 to be inserted into the pipe joint body 101B (see FIG. 10). The inner diameter of the large inner diameter section HBB is greater than that of the middle inner diameter section HMB and greater than the outer diameter of the inner tube 105B to be inserted in the pipe joint body 101B.

The small inner diameter section HSB does not house other members.

A tip of the flexible pipe 200 is inserted into the middle inner diameter section HMB (see FIG. 10). In a state before insertion of the flexible pipe 200, the compressive member 115B, the movable piece 114B, the elastic member 110B, the gasket 104B, the fireproof gasket 103B, the retainer 102B, and a part of the inner tube 105B are housed basically in this order in the middle inner diameter section HMB (see FIG. 11).

The middle inner diameter section HMB includes a protrusion 101aB, a pressing part 101cB, and an inner surface 101bB arranged in this order in a direction of moving away from the small inner diameter section HSB, namely, toward the X negative direction (see FIG. 11).

The protrusion 101aB protrudes from an inner wall of the middle inner diameter section HMB toward the center axis CA of the middle inner diameter section HMB. The protrusion 101aB has a surface defined in the X negative direction on which the elastic member 110B is supported. The protrusion 101aB has a surface defined in the X positive direction with which one end of the compressive member 115B is latched.

A part of the flexible pipe 200 continuous with the tip of the flexible pipe 200 is inserted into the large inner diameter section HBB (see FIG. 10). In a state before insertion of the flexible pipe 200, a part of the inner tube 105B, the stop ring 106B, the watertight O-ring 107B, and the indicator member 108B are housed basically in this order in the large inner diameter section HBB.

The large inner diameter section HBB has an inner surface provided with a first stop ring groove 101eB and a second stop ring groove 101dB arranged in this order in a direction of moving away from the small inner diameter section HSB, namely, toward the X negative direction.

The first stop ring groove 101eB is a groove having a width slightly greater than the thickness of the stop ring 106B along the center axis CA as viewed in the direction along the center axis CA. The first stop ring groove 101eB has a depth with which a part of the stop ring 106B on its outer peripheral side is housed.

The first stop ring groove 101eB has a configuration similar to that of the first indicator ring groove 101e according to the first example (see FIG. 5). An inner wall of the first stop ring groove 101eB closer to the small inner diameter section HSB is substantially vertical to the bottom surface of the first stop ring groove 101eB. The first stop ring groove 101eB has a first tapered surface formed on an inner wall thereof on the opposite side of the small inner diameter section HSB. The first tapered surface is arranged at an angle greater than 90° relative to the bottom surface of the first stop ring groove 101eB. The first tapered surface has a shape that is reduced in inner diameter toward the X negative direction. A second tapered surface 101gB is continuous with the first tapered surface through a surface parallel to the center axis CA and has a shape that is increased in inner diameter toward the X negative direction.

The second stop ring groove 101dB is a groove having a width greater than the thickness of the stop ring 106B along the center axis CA as viewed in the direction along the center axis CA. The second stop ring groove 101dB has a depth with which a part of the stop ring 106B on its outer peripheral side is housed. The second stop ring groove 101dB fulfills a function comparable to the function of the first stop ring groove 101d according to the first example (see FIG. 4).

The movable piece 114B is a tubular member with a flange at an end thereof in the X positive direction. The movable piece 114B is arranged in a range overlapping the compressive member 115B, the elastic member 110B, and the gasket 104B as viewed in the X direction. The movable piece 114B is arranged closer to the center axis CA than the compressive member 115B, the elastic member 110B, and the gasket 104B. In a state before insertion of the flexible pipe 200, an outer peripheral edge of the flange of the movable piece 114B prevents deformation of the compressive member 115B toward the center axis CA (see FIG. 11). As a result, one end of the compressive member 115B becomes latched with a surface of the protrusion 101aB defined in the X positive direction. By doing so, the elastic member 110B is compressed between the other end of the compressive member 115B and the protrusion 101aB.

The gasket 104B, the fireproof gasket 103B, and the retainer 102B are arranged in this order between the compressive member 115B and the inner tube 105B as viewed in the X direction. The configuration and function of the gasket 104B, those of the fireproof gasket 103B, and those of the retainer 102B are substantially the same as those of the gasket 104, those of the fireproof gasket 103, and those of the retainer 102 respectively according to the first example. The configuration and function of the retainer 102B will be described later in detail.

The inner tube 105B is a member having an approximately tubular shape. The inner tube 105B includes a small outer diameter section ES and a large outer diameter section EB arranged in a direction of a tube center axis and centered at the same center axis CA.

The small outer diameter section ES is housed inside the retainer 102B.

A part of the large outer diameter section EB covering an end thereof in the X negative direction is exposed from the pipe joint body 101B. The other part of the large outer diameter section EB is housed in the pipe joint body 101B. The large outer diameter section EB has an outer surface provided with a third stop ring groove 105aB, a watertight O-ring groove 105hB, and an indicator housing 105kB arranged in this order in a direction of moving away from the small outer diameter section ES, namely, toward the X negative direction.

The third stop ring groove 105aB has a width slightly greater than the thickness of the stop ring 106B along the center axis CA as viewed in the direction along the center axis CA. In a state without application of external force, the third stop ring groove 105aB functions as a member housing a part of the stop ring 106B and has a depth with which the stop ring 106B is housed.

In a state before insertion of the flexible pipe 200, the stop ring 106B is partially housed in the first stop ring groove 101eB of the pipe joint body 101B and is partially housed in the third stop ring groove 105aB of the inner tube 105B. As a result, the inner tube 105B is located at a position determined relative to the pipe joint body 101B.

The watertight O-ring groove 105hB is a groove having a width slightly greater than the thickness of the watertight O-ring 107B along the center axis CA as viewed in the direction along the center axis CA. The watertight O-ring groove 105hB houses the watertight O-ring 107B. An opening of the watertight O-ring groove 105hB is closed by the pipe joint body 101B.

The indicator housing 105kB is a recess provided within a partial range of the large outer diameter section EB in a circumferential direction. In a state before insertion of the flexible pipe 200, the indicator housing 105kB is located in the pipe joint body 101B. The indicator housing 105kB houses the indicator member 108B.

A groove part 105 TB is provided at a position closer to the X negative direction than the indicator housing 105kB on an inner peripheral surface of the large outer diameter section EB as viewed in the direction along the center axis CA. The groove part 105 TB is a groove having a width slightly less than the thickness of the watertight gasket 112B along the center axis CA as viewed in the direction along the center axis CA. The groove part 105 TB houses a part of the watertight gasket 112B on its outer peripheral side.

B2. Connecting Work

By inserting the flexible pipe 200 in the X positive direction in the state of FIG. 11, the tip of the flexible pipe 200 passes through the interior of the ring-like retainer 102B to press the movable piece 114B in the X positive direction. The resultant pressing force moves the movable piece 114B in the X positive direction. As a result, the compressive member 115B is allowed to deform toward the center axis CA to detach the one end of the compressive member 115B from the protrusion 101aB. This releases the elastic member 110B from constraint to cause the elastic member 110B to expand in the X direction.

As a result of the expansion of the elastic member 110B, the inner tube 105B is pushed toward the X negative direction through the gasket 104B, the fireproof gasket 103B, and the retainer 102B. The stop ring 106B moves from the first stop ring groove 101eB to the second stop ring groove 101dB. As a result, the stop ring 106B is partially housed in the second stop ring groove 101dB of the pipe joint body 101B and is partially housed in the third stop ring groove 105aB of the inner tube 105B. The inner tube 105B is located at a relative position shown in FIG. 10 determined relative to the pipe joint body 101B by the stop ring 106B. In this state, the indicator member 108B is partially exposed from the pipe joint body 101B and is visually recognizable from outside.

The gasket 104B functions as a receiving part for receiving the tip of the flexible pipe 200. While the tip of the flexible pipe 200 is held by the gasket 104B, a plurality of pawls 102nB of the retainer 102B is inside the valley 222 of the corrugated pipe 220. A step section HCB located between the small inner diameter section HSB and the middle inner diameter section HMB receives the tip of the movable piece 114B moved by the flexible pipe 200 (see an upper right area in FIG. 10).

While the flexible pipe 200 is connected to the pipe joint 100B, the pipe joint body 101B houses the retainer 102B in an area corresponding to the inner surface 101bB having an inner diameter ID101 greater than an outer diameter ED102 of a circular tube defined by outer peripheries of a plurality of supports 102sB of the retainer 102B (see FIG. 10). Even in a state before insertion of the flexible pipe 200, the inner surface 101bB of the pipe joint body 101B and the outer peripheral surface of the support 102sB of the retainer 102B do not contact each other (see FIG. 11). This configuration facilitates incorporation of the retainer 102B into the pipe joint body 101B.

B3. Retainer

Figure 12:
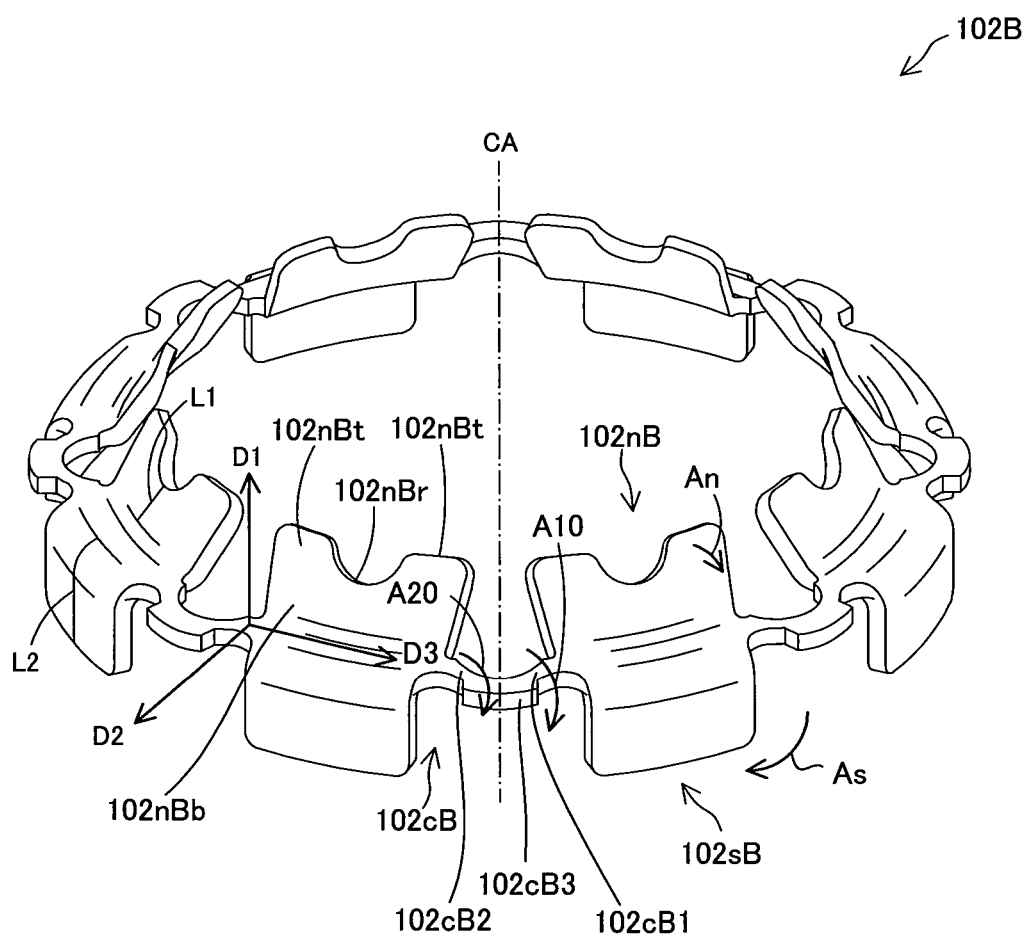
FIG. 12 is a perspective view showing a retainer.

FIG. 12 is a perspective view showing the retainer 102B. The retainer 102B has a ring-like shape. The following description is mainly directed to a difference of the retainer 102B from the retainer 102 of the first example. The configuration and function of the retainer 102B omitted from the following description are common to those of the retainer 102.

In a state before insertion of the flexible pipe 200, the retainer 102B is arranged in the middle inner diameter section HMB of the pipe joint body 101B (see FIG. 11). While the flexible pipe 200 and the pipe joint 100B are connected to each other, the retainer 102B is arranged in the middle inner diameter section HMB and the large inner diameter section HBB of the pipe joint body 101B (see FIG. 10).

The retainer 102B includes the pawls 102nB, connectors 102cB, and the supports 102sB.

The plurality of pawls 102nB is plate-like members evenly spaced in a circumferential direction inside the pipe joint body 101B and each protruding toward the X positive direction (see FIG. 11). While the flexible pipe 200 and the pipe joint 100B are connected to each other, these pawls 102nB get into the valley 222 of the corrugated pipe 220 (see FIG. 10).

Each of the plurality of pawls 102nB includes two tips 102nBt, 102nBt, and a base 102nBb. The base 102nBb is continuous with the support 102sB corresponding to the pawl 102nB including this base 102nBb. The two tips 102nBt, 102nBt extend toward the center axis CA. The two tips 102nBt are configured to be thinner than the base 102nBb. A recess 102nBr is provided between the tips 102nBt, 102nBt adjacent to each other.

The support 102sB is continuous with the corresponding pawl 102nB as viewed in a direction of the center axis of the ring corresponding to the approximate shape of the retainer 102B. The center axis of the ring of the retainer 102B is the same as the center axis CA of the pipe joint body (see FIG. 12). The support 102sB is a plate-like member protruding in a direction parallel to the center axis CA of the pipe joint body and in a direction of moving away from the pawl 102nB. The support 102sB is arranged parallel to the inner surface 101bB of the large inner diameter section HB (see FIG. 11).

The connectors 102cB are members connecting the pawls 102nB and the supports 102sB in a plurality of combinations along a peripheral direction inside the pipe joint body 101B. The connector 102cB has lower strength than the pawl 102nB and the support 102sB. The connector 102cB is configured to cause deformation more easily than the pawl 102nB and the support 102sB. The "deformation" mentioned herein includes elastic deformation and plastic deformation. While the flexible pipe 200 is connected to the pipe joint 100B, the connector 102cB is caught between the fireproof gasket 103B and the inner tube 105B (see a central area in FIG. 10). The retainer 102B is configured to rotate such to cause the pawl 102nB to move toward a direction of the inner surface 101bB of the pipe joint body 101B and to cause the support 102sB to move toward a direction of the outer periphery of the flexible pipe 200 about the connector 102cB (see an arrow An and an arrow As in FIG. 12). When the flexible pipe 200 is inserted into the pipe joint 100B and a peak of the corrugated pipe 220 passes through the interior of the ring-like retainer 102B, the retainer 102B deforms in the above-described manner.

Figure 13:
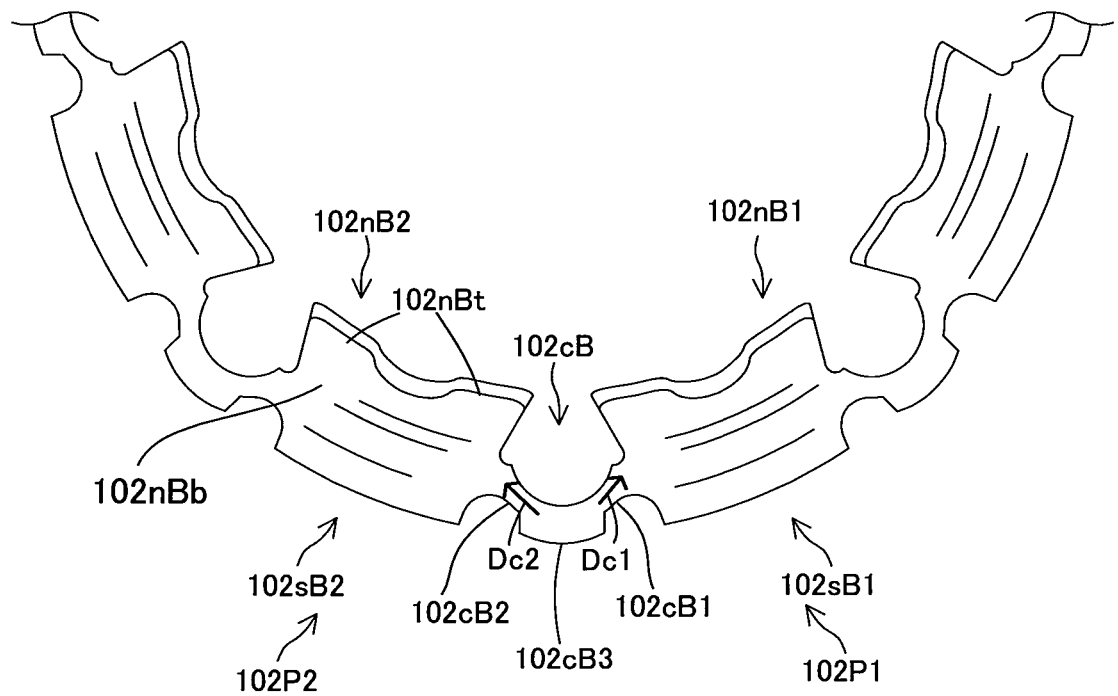
FIG. 13 is a plan view showing a part of the configuration of the retainer.
Figure 14:
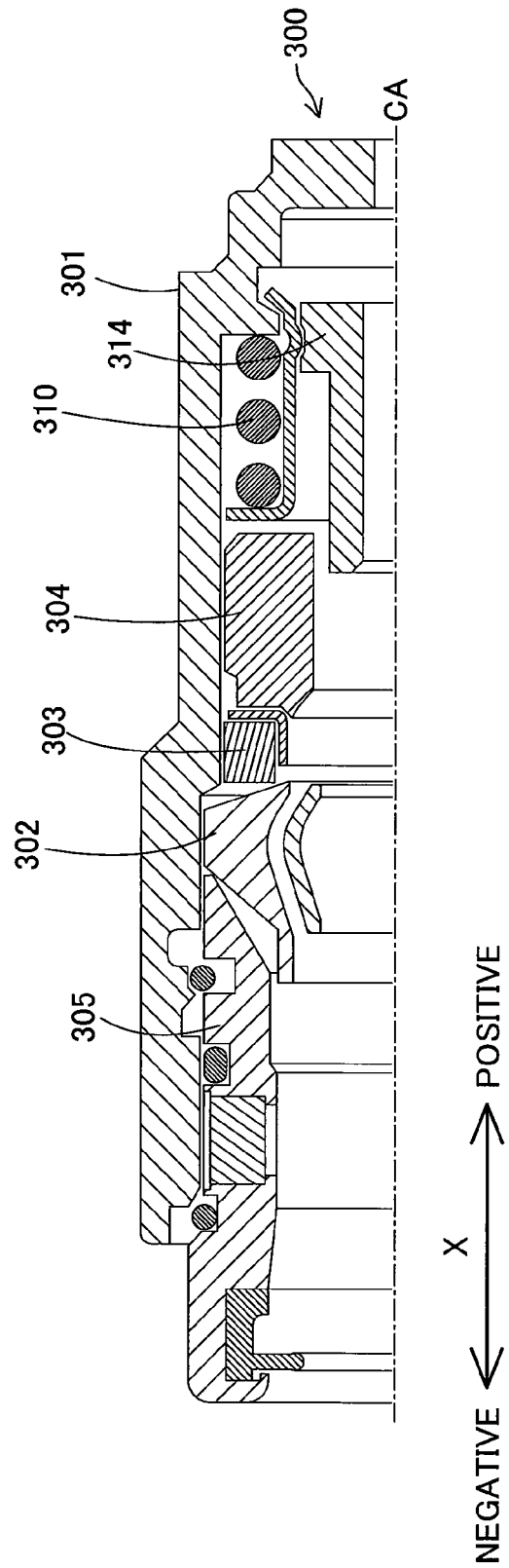
FIG. 14 is a partial sectional side view showing a conventional pipe joint in a state before construction.

FIG. 13 is a plan view showing a part of the configuration of the retainer 102B. The connector 102cB includes a first section 102cB1, a second section 102cB2, and a third section 102cB3.

The first section 102cB1 extends toward a first combination 102P1 that is one of two combinations each including the pawl 102nB and the support 102sB and arranged across the connector 102cB (see an arrow Dc1 in FIG. 13). The first section 102cB1 is connected to the first combination 102P1. In FIG. 13, the pawl 102nB and the support 102sB forming the first combination 102P1 are designated as a pawl 102nB1 and a support 102sB1 respectively.

The second section 102cB2 extends toward a second combination 102P2 that is the other of the two combinations each including the pawl 102nB and the support 102sB and arranged across the connector 102cB (see an arrow Dc2 in FIG. 13). The second section 102cB2 is connected to the second combination 102P2. In FIG. 13, the pawl 102nB and the support 102sB forming the second combination 102P2 are designated as a pawl 102nB2 and a support 102sB2 respectively. The first section 102cB1 and the second section 102cB2 extend in the directions Dc1 and Dc2 differing from each other.

At the retainer 102B, in response to rotation of the support 102sB belonging to the first combination 102P1, the first section 102cB1 receives torsion from the first combination 102P1 acting in the direction Dc1 in which the first section 102cB1 extends to get warped (see the arrow As and an arrow A10 in FIG. 12). On the other hand, the second section 102cB2 extends in the direction Dc2 differing from the direction of the first section 102cB1. Thus, in response to the rotation of the support 102sB belonging to the first combination 102P1, the second section 102cB2 receives bending force to be bent (see the arrow As and an arrow A20 in FIG. 12). Likewise, in response to rotation of the support 102sB belonging to the second combination 102P2, the second section 102cB2 receives torsion from the second combination 102P2 acting in the direction Dc2 in which the second section 102cB2 extends to get warped. On the other hand, the first section 102cB1 extends in the direction Dc1 differing from the direction of the second section 102cB2. Thus, in response to the rotation of the support 102sB belonging to the second combination 102P2, the first section 102cB1 receives bending force to be bent.

As described above, at the retainer 102B, in response to rotation of one support 102sB, the first section 102cB1 and the second section 102cB2 of the connector 102cB next to this support 102sB receive bending force and torsion to deform in their ways, thereby absorbing displacement of the support 102sB. This allows the retainer 102B to stably deform more easily than in a configuration in which the connector 102cB connects the first combination 102P1 and the second combination 102P2 linearly. If one support 102sB rotates more largely than a different support 102sB, for example, a likelihood of break of the connector 102cB in the vicinity of this support 102sB is reduced.

The third section 102cB3 is arranged between the first section 102cB1 and the second section 102cB2. The third section 102cB3 is configured to cause deformation with difficulty as compared with the first section 102cB1 and the second section 102cB2. The "deformation" herein includes elastic deformation and plastic deformation. More specifically, the third section 102cB3 has the same thickness as and has a greater width than the first section 102cB1 and the second section 102cB2. The widths of the first section 102cB1, the second section 102cB2, and the third section 102cB3 mean their minimum dimensions as viewed in directions vertical to the respective lengthwise directions of the first section 102cB1, the second section 102cB2, and the third section 102cB3.

In the above-described configuration, in response to rotation of the support 102sB connected to the connector 102cB (see the arrow As in FIG. 12), the third section 102cB3 less likely to deform located between the first section 102cB1 and the second section 102cB2 acts to retain the orientations of the first section 102cB1 and the second section 102cB2 relative to each other (see the arrows Dc1 and Dc2 in FIG. 12). This fulfills the function of sharing torsion and bending force between the first section 102cB1 and the second section 102cB2 more easily than in a configuration in which the third section 102cB3 is absent in the retainer 102B.

B4. Function Fulfilled in Response to Application of External Force

Described next is how the pipe joint 100B functions in response to application of force in the X negative direction to the flexible pipe 200 after connection of the flexible pipe 200 to the pipe joint 100B. When the force acting in the X negative direction is applied to the flexible pipe 200, the pawl 102nB inside the valley 222 of the corrugated pipe 220 is engaged in the corrugated pipe 220 to prevent pulling of the flexible pipe 200 out of the pipe joint 100B.

If the pawl 102nB has an approximately rectangular outer shape curved concentrically with the ring of the retainer 102B, the tip of the pawl 102nB contacts the valley 222 of the corrugated pipe 220 at a linear contact area, more specifically, at an arc-like contact area (see FIGS. 1 and 6). By contrast, at the retainer 102B of the second example, the plurality of tips 102nBt of the pawl 102nB each contacts the valley 222 of the corrugated pipe 220 at a smaller contact area (see FIGS. 10 and 12). This allows the corrugated pipe 220 to be retained more firmly.

At the retainer 102B of the second example, the tips 102nBt, which are configured to be thinner than the base 102nBb, each contact the valley 222 of the corrugated pipe 220 at a contact area smaller than that in a configuration in which the pawl 102nB is formed into a constant thickness (see FIG. 10). This allows the corrugated pipe 220 to be retained more firmly.

The base 102nBb is configured to be thicker than the tip 102nBt. This allows the base 102nBb to work effectively in inhibiting plastic deformation of the pawl 102nB to be caused by force applied to the pawl 102nB.

When force acting in the X negative direction is applied to the flexible pipe 200, the pawl 102nB inside the valley 222 of the corrugated pipe 220 receives force from the corrugated pipe 220 acting in a direction opposite the arrow An in FIG. 12. As a result, the support 102sB continuous with each pawl 102nB tries to rotate in the direction opposite the arrow As in FIG. 12.

The pipe joint body 101B and the retainer 102B are configured such that, when the corrugated pipe 220 receives force acting in a direction of pulling the corrugated pipe 220 out of the pipe joint 100B while the plurality of pawls 102nB is inside the valley 222, the supports 102sB having received the force through these pawls 102nB rotate to contact the housing 101bB.

In this configuration, when the corrugated pipe 220 receives force acting in a direction of pulling the corrugated pipe 220 out of the pipe joint 100B, the pipe joint body 101B prevents the support 102sB from rotating to a degree equal to or greater than a certain degree. According to this example, an end of the inner surface 101bB of pipe joint body 101B in the X negative direction and an end of the inner tube 105B in the X positive direction act to prevent rotation of the support 102sB (see FIG. 10). As a result, it becomes possible to strongly prevent pulling out of the corrugated pipe 220 using the retainer 102B.

C. Other Examples

C1. Another Example 1

(1) In the above-described first example, the connector 102c is formed thinner than the pawl 102n and the support 102s (see FIG. 6). However, the connector may be formed into the same dimension as the pawl or the support. In this configuration, the connector may be made of a material more deformable than those of the pawl and the support.

(2) In the above-described second example, as the flexible pipe 200 is inserted in the X positive direction, one end of the compressive member 115B is detached from the protrusion 101aB. Then, the elastic member 110B expands to push the inner tube 105B toward the X negative direction (see FIGS. 11 and 10). In an alternative configuration, after insertion of the flexible pipe 200 in the X positive direction, a user may pull out the inner tube 105B in the X negative direction until a part of the indicator member 108B is exposed from the pipe joint body 101B.

(3) In the above-described second example, the third section 102cB3 of the retainer 102B has the same thickness as and has a greater width than the first section 102cB1 and the second section 102cB2. However, the third section may be configured to have a greater thickness than the first section and the second section, or may be made of a material of higher rigidity than those of the first section and the second section. Alternatively, a different structure that enhances rigidity not provided to the first section and the second section may be attached to the third section. Specifically, what is required for the third section of the retainer is to be less deformable than the first section and the second section.

C2. Another Example 2

In the above-described second example, the connector 102cB of the retainer 102B includes the first section 102cB1 and the second section 102cB2 extending lengthwise in the directions Dc1 and Dc2 respectively differing from each other (see FIGS. 12 and 13). However, the connector of the retainer may have a different configuration such as a configuration in which the connector linearly connects the first combination 102P1 of the pawl 102nB and the support 102sB and the second combination 102P2 of the pawl 102nB and the support 102sB.

C3. Another Example 3

In the above-described second example, the connector 102cB of the retainer 102B includes the third section $102c$B3 less deformable elastically than the first section $102c$B1 and the second section $102c$B2, in addition to the first section $102c$B1 and the second section $102c$B2 (see FIGS. 12 and 13). However, the connector of the retainer may have a configuration without the third section like in the first example.

C4. Another Example 4

In the above-described second example, the pawl $102n$B includes the two tips $102n$Bt, $102n$Bt (see FIGS. 12 and 13). However, at least some of the pawls may be configured not to include a plurality of tips. Like the pawl $102n$ of the first example, a configuration without a plurality of divided tips is applicable.

C5. Another Example 5

In the above-described second example, the tip $102n$Bt of the pawl $102n$B is configured to be thinner than the base $102n$Bb (see FIGS. 12 and 13). However, the tip of the pawl may be formed to the same thickness as the base, or may be formed to a greater thickness than the base.

C6. Another Example 6

The pipe joint 100 of the above-described first example includes the fireproof gasket 103, the indicator ring 108, and the third stop ring 109. However, one or more of these structures may be omitted from the configuration of the pipe joint.

C7. Another Example 7

In the above-described examples, the retainer 102 is configured such to rotate the support $102s$ toward the direction of the inner surface $101b$ of the pipe joint body 101 and to rotate the pawl $102n$ toward the direction of the outer periphery of the flexible pipe 200 about the connector $102c$ (see FIGS. 6 and 12). However, the retainer may be configured not to rotate one of the pawl and the support in this way. For example, the pipe joint may be configured not to rotate the support by employing a configuration in which the inner surface of a structure housing the retainer and the support are in contact with each other previously.

C8. Another Example 8

In the above-described first example, the retainer 102 is engaged at the backward valley 222 spaced by one peak from an end of the corrugated pipe 220 (see FIG. 1). However, the pipe joint may be configured to engage the retainer 102 at a backward valley spaced by two or more peaks from the end of the corrugated pipe.

C9. Another Example 9

In the above-described first example, the relative distance RL between the retainer 102 and the elastic member 110 is limited by the pipe joint body 101 and the cover member 111 (see FIG. 9). However, like in the configuration of the second example, the relative distance between the retainer 102B and the elastic member 110B may not be limited.

C10. Another Example 10

In the above-described second example, the pipe joint body 101B and the retainer 102B are configured such that, when the corrugated pipe 220 receives force acting in a direction of pulling the corrugated pipe 220 out of the pipe joint 100B, the supports $102s$B having received the force through the plurality of pawls $102n$B rotate to contact the housing $101b$B (see FIGS. 10 and 12). However, the pipe joint body and the retainer may be configured such that the support and the housing are in contact with each other previously. Alternatively, independently of the presence or absence of external force, the support may be configured not to contact the housing.

My retainers, joints and methods are not limited to the examples described above and is able to be realized with various configurations without departing from the spirit thereof. For example, technical features in the examples corresponding to the technical features in the SUMMARY are able to be replaced with each other or combined together as necessary to address problems described previously or to achieve part or the whole of the effects described previously. When the technical features are not described as essential features herein, they are able to be deleted as necessary.

CROSS-REFERENCE TO RELATED APPLICATIONS

This application claims priority from Japanese Patent Application P2019-67158 filed on Mar. 29, 2019, the disclosure of which is incorporated herein in its entirety by reference.

What is claimed is:

1. A pipe joint comprising a pipe joint body housing a retainer having a shape of a ring adapted for insertion of a flexible pipe with a corrugated pipe formed into a corrugated pattern in an axis direction that makes the retainer available in a pipe joint connected to the flexible pipe, the retainer comprising:
 a plurality of pawls adapted to engage a valley of the corrugated pattern of the corrugated pipe;
 a plurality of supports that contact an inner surface of a pipe joint body housing the retainer in the pipe joint, the supports being continuous with corresponding ones of the pawls as viewed in a direction of a center axis of the ring of the retainer; and
 a connector connecting the pawls and the supports in a plurality of combinations continuous with each other, wherein
 the connector is more deformable than the pawls and the supports, and
 when the retainer is not subjected to external force, a distance between the center axis of the ring of the retainer and each of the plurality of the pawls is less than a distance between a center axis of the corrugated pipe and a corrugated peak of the corrugated pipe,
 wherein the connector includes:
 a first section extending toward a first combination that is one of two combinations each including a pawl of the plurality of pawls and a support of the plurality of supports and arranged across the connector, the first section being connected to the first combination; and
 a second section extending toward a second combination that is another of the two combinations, the second section being connected to the second combination,
 wherein the first section and the second section extend in differing directions.

2. The pipe joint according to claim 1, wherein the pipe joint is configured to rotate the support toward a direction of the inner surface of the pipe joint body and rotate the pawl toward a direction of an outer periphery of the flexible pipe about the connector of the retainer.

3. The pipe joint according to claim 1, further comprising:

a receiving part that receives a tip of the flexible pipe after being inserted, wherein the pawl of the retainer is provided at a position at which the pawl is to be engaged with the corrugated pipe of the flexible pipe at a backward valley spaced by one peak from the tip of the flexible pipe while an amount of insertion of the flexible pipe is limited by the receiving part.

4. The pipe joint according to claim 1, further comprising:

a gasket formed into a ring shape that receives the flexible pipe; and a pressure member that presses an end surface of the gasket in a direction of insertion of the flexible pipe, wherein the pressure member, the gasket, and the retainer are arranged in this order in the direction of insertion of the flexible pipe, and a relative distance between the pressure member and the retainer is limited by a fixing member including the pipe joint body.

5. The pipe joint according to claim 1, wherein the pipe joint body houses the retainer in a housing having an inner diameter greater than an outer diameter defined by outer peripheries of the plurality of supports of the retainer, and the pipe joint body and the retainer are configured such that, when the corrugated pipe receives force acting in a direction of pulling the corrugated pipe out of the pipe joint while the plurality of pawls is inside the valley, the support having received the force through the plurality of pawls rotates to contact the housing.

* * * * *